(12) United States Patent
Ikematsu et al.

(10) Patent No.: US 7,300,591 B2
(45) Date of Patent: Nov. 27, 2007

(54) WASTEWATER TREATING METHOD AND WASTEWATER TREATING APPARATUS

(75) Inventors: Mineo Ikematsu, Gunma (JP); Masahiro Iseki, Gunma (JP); Daizo Takaoka, Gunma (JP)

(73) Assignee: Sanyo Electronic Co., Ltd., Osaka (JP)

( * ) Notice: Subject to any disclaimer, the term of this patent is extended or adjusted under 35 U.S.C. 154(b) by 375 days.

(21) Appl. No.: 10/481,129

(22) PCT Filed: Apr. 15, 2003

(86) PCT No.: PCT/JP03/04741

§ 371 (c)(1),
(2), (4) Date: Aug. 13, 2004

(87) PCT Pub. No.: WO03/086980

PCT Pub. Date: Oct. 23, 2003

(65) Prior Publication Data

US 2004/0251212 A1   Dec. 16, 2004

(30) Foreign Application Priority Data

| Apr. 18, 2002 | (JP) | ............................ 2002-116094 |
| Jun. 13, 2002 | (JP) | ............................ 2002-172836 |
| Jun. 28, 2002 | (JP) | ............................ 2002-189934 |
| Sep. 10, 2002 | (JP) | ............................ 2002-263841 |

(51) Int. Cl.
   *C02F 1/46* (2006.01)

(52) U.S. Cl. .................................... 210/748

(58) Field of Classification Search ................. 210/748
   See application file for complete search history.

(56) References Cited

U.S. PATENT DOCUMENTS

| 5,437,776 A | 8/1995 | Schwabegger et al. |
| 2002/0056674 A1* | 5/2002 | Iseki et al. .................. 210/143 |
| 2003/0168411 A1* | 9/2003 | Hiro et al. .................. 210/748 |

FOREIGN PATENT DOCUMENTS

| CA | 2115353 A | 1/1994 |
| DE | 4344613 A | 6/1995 |
| EP | 605675 A1 | 7/1994 |
| EP | 0 659 692 A1 | 6/1995 |
| JP | 54-120947 | 9/1979 |
| JP | 6-509989 A | 11/1994 |
| JP | 11-90448 | 4/1999 |
| JP | 2000-117259 A | 4/2000 |
| JP | 2001-252667 A | 9/2001 |
| JP | 2001-300538 A | 10/2001 |
| WO | WO 94/00388 | 1/1994 |

* cited by examiner

*Primary Examiner*—Robert A. Hopkins
(74) *Attorney, Agent, or Firm*—McDermott Will & Emery LLP

(57) ABSTRACT

There is here disclosed a wastewater treating technique for treating nitrogen compounds in a for-treatment wastewater by an electrochemical technique, wherein at least portions of a pair of electrodes is immersed in the for-treatment wastewater; a material of one electrode constituting an anode is an insoluble conductor; and a material of the other electrode constituting a cathode is an element in the group VIII of the periodic table, a conductor containing the element in the group VIII, or a conductor covered with the element in the same group or the conductor containing the element in the same group.

35 Claims, 8 Drawing Sheets

FIG. 1
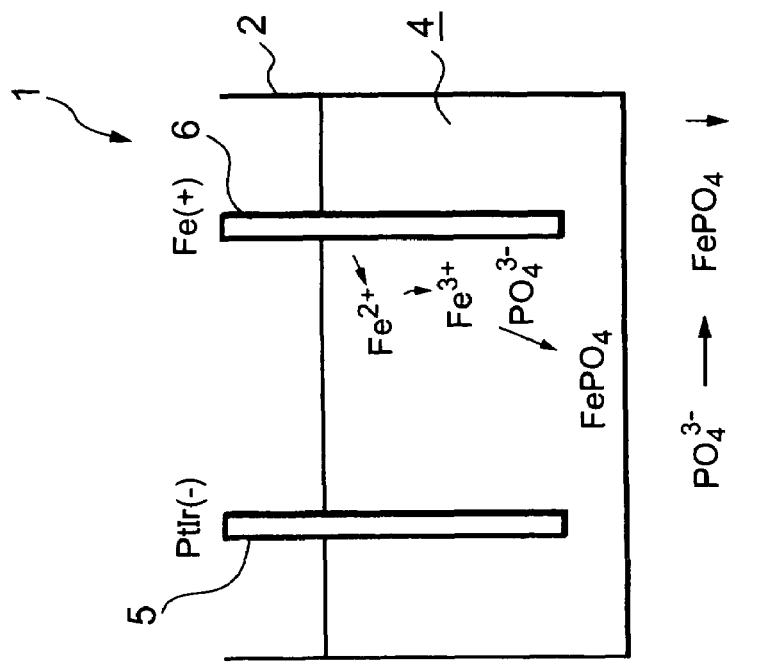
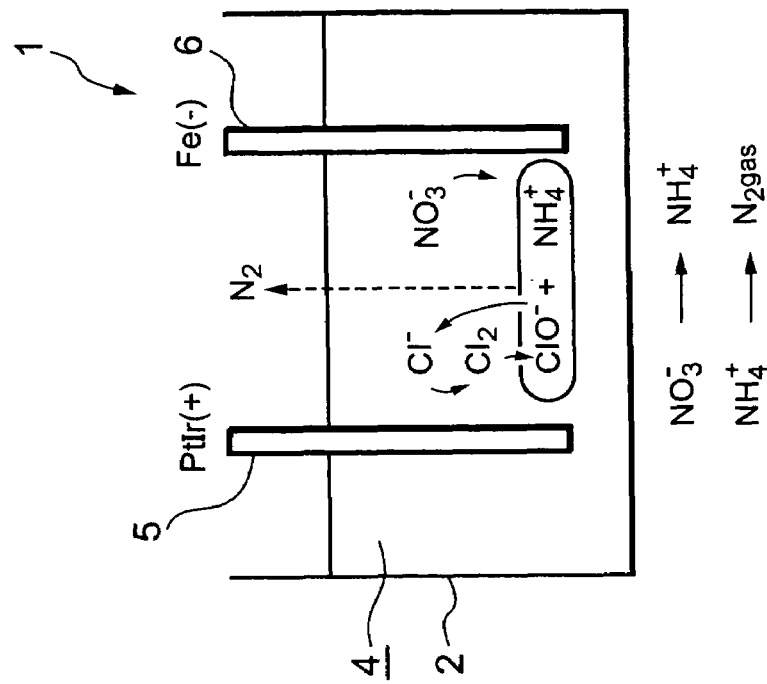

FIG. 6
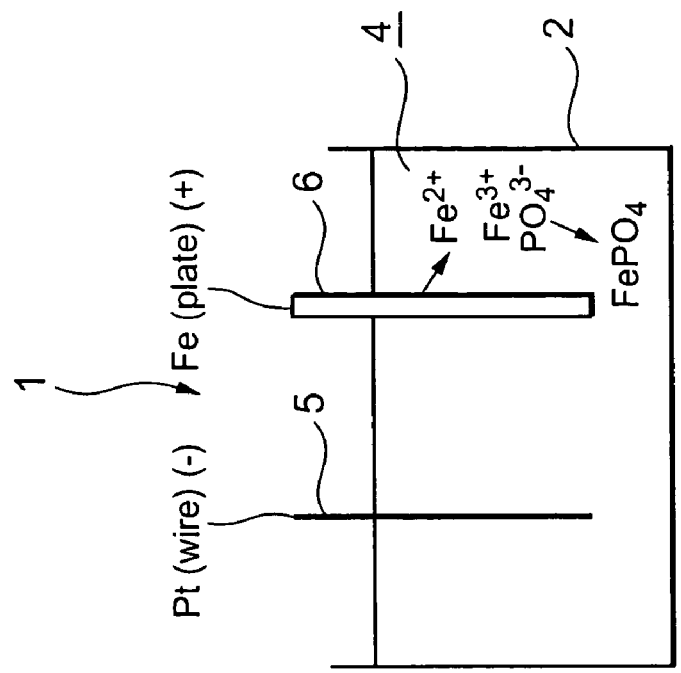
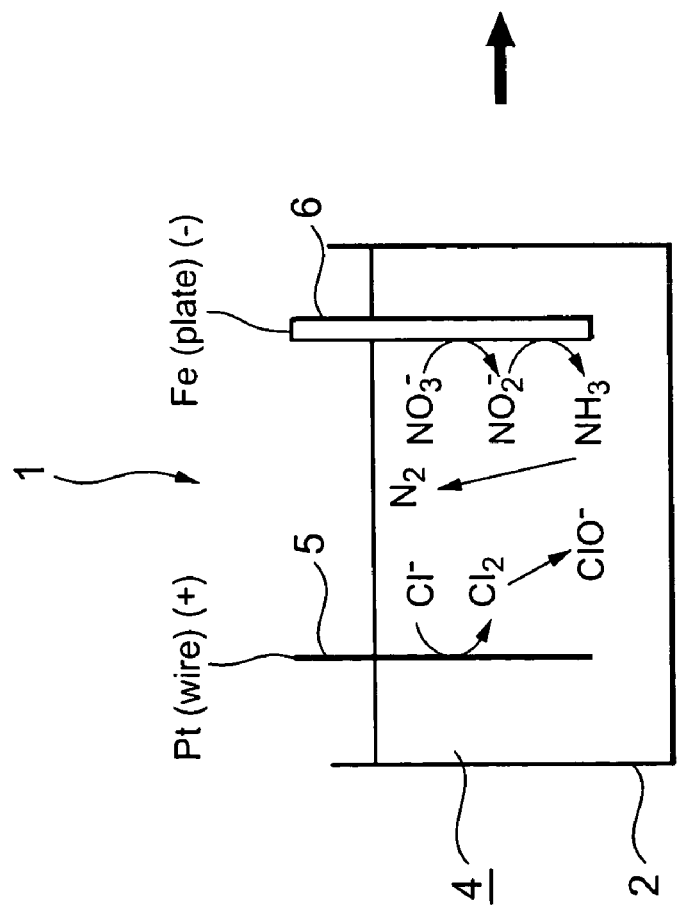

WASTEWATER TREATING METHOD AND WASTEWATER TREATING APPARATUS

BACKGROUND OF THE INVENTION

1. Field of the Invention

The present invention relates to a method and an apparatus for treating a wastewater containing nitrogen compounds such as organic nitrogen, nitrite nitrogen, nitrate nitrogen and ammonia nitrogen, and phosphorus compounds such as phosphoric acid and phosphate ions (hereinafter, "a wastewater to be treated" will be referred to as "a for-treatment wastewater").

2. Description of the Related Art

It is already well known that the existence of nitrogen compounds is one of causes of eutrophication of rivers and lakes. The nitrogen compounds much exist in domestic life wastewater or industrial wastewater, but it is difficult to purify them and there are no effective countermeasures up to date. In general, a biological treatment has been implemented. However, the biological treatment comprises two processes, i.e., a nitrification process for converting ammonia nitrogen to nitrate nitrogen, and a denitrification process for converting nitrate nitrogen to a nitrogen gas. Accordingly, there has been a problem that two different reaction vessels are required. There has been a further problem that because a time required for the treatment is long, the treatment efficiency is low.

Further, in this biological treatment, there has been another problem that a large-capacity anaerobic vessel is necessary for keeping nitrifying bacteria and denitrifying bacteria, thereby to induce the increase in equipment construction cost and apparatus installation area. There has been a further problem that the nitrifying bacteria and the denitrifying bacteria are largely influenced by ambient temperature environment, components contained in the for-treatment wastewater, and the like, and in particular, during the winter season when the temperature is low, their activities are lowered to deteriorate the denitrifying action, resulting in an unstable processing efficiency.

Accordingly, there has been proposed a method for solving the foregoing technical problems, wherein a current is fed to the for-treatment wastewater to decompose ammonia, nitrite nitrogen and nitrate nitrogen through oxidation or reduction into a nitrogen gas. In such a conventional electrolytic process for the for-treatment wastewater, a noble metal such as platinum, iridium or palladium is used as an anode.

In this process, a current is allowed to flow through the for-treatment wastewater, so that ammonia nitrogen is oxidized with active oxygen or hypochlorous acid at the anode, and nitrogen compounds are converted into a nitrogen gas, whereby the treatment of the nitrogen compounds is accomplished.

In addition to the above process, there is another process in which iron is used for electrodes constituting an anode and a cathode, and a current is allowed to flow through the for-treatment wastewater, so that ammonia, nitrite nitrogen and nitrate nitrogen are oxidized or reduced to decompose the for-treatment wastewater into a nitrogen gas.

However, in the conventional nitrogen compounds treating method based on the electrolysis, a removal treatment ability of the nitrogen compounds is poor, and hence, it is difficult to treat the nitrogen compounds in the actual treatment of the life wastewater or the industrial wastewater. In addition, nitrate nitrogen scarcely becomes the nitrogen gas, and the removal of nitrate ions at a low concentration is difficult. Consequently, there is also a problem that they remain as a nitrogen component in the wastewater and they cannot be removed.

Furthermore, in the nitrogen treating method by the electrolysis in which the iron electrodes are used, the nitrogen compounds in the for-treatment wastewater are treated by use of iron dissolved in the for-treatment wastewater. Therefore, it is necessary to dissolve a great deal of iron in the for-treatment wastewater, which causes a problem of durability. Moreover, the iron ions dissolved in the for-treatment wastewater brings about a precipitation reaction together with phosphorus compounds present in the for-treatment wastewater, and at this time, they are precipitated in the form of iron phosphate and the like. In this case, a sludge is produced in large quantities from iron phosphate and the like, which causes a problem of its disposal.

Accordingly, the present applicant has already suggested a method in which an alloy of copper and zinc, copper and nickel, or the like is used as a cathode, and a noble metal material such as platinum, iridium or palladium is used as an anode to electrolyze a for-treatment wastewater. According to this treatment method, a reductive reaction of nitrate nitrogen in the for-treatment wastewater into nitrite nitrogen and ammonia is accelerated at the cathode, and ammonia produced at the cathode can bring about a denitrification reaction together with hypochlorous acid produced at the anode. The thus obtainable synergistic effect enables shortening a time taken for the reductive reaction, and treating nitrate ions even at a low concentration.

However, in a case where an alloy containing copper in the cathode is used, harmful copper ions dissolved in the for-treatment wastewater inevitably cause a problem. Therefore, it has been desired to develop a treatment method of the nitrogen compounds without any production of harmful substances.

Furthermore, in the conventional treatment method of the nitrogen compounds by the electrolysis, a surface area of a portion of an electrode constituting the anode which is immersed in the for-treatment wastewater is substantially equal to that of a portion of an electrode constituting the cathode which is immersed in the for-treatment wastewater. In consequence, a reductive reaction of nitrate nitrogen, i.e., nitrate ions into nitrite ions at the cathode is inhibited by an oxidation reaction of nitrite ions into nitrate ions at the anode, whereby a treatment ability of removing the nitrogen compounds inconveniently deteriorates.

The present invention has been developed to solve the above conventional technical problems, and an object of the present invention is to provide a wastewater treating method and a wastewater treating apparatus by which nitrogen compounds are effectively removed without any production of harmful substances, and miniaturization of the apparatus and decrease in costs can be achieved.

SUMMARY OF THE INVENTION

A first aspect of the present invention is directed to a wastewater treating method for treating nitrogen compounds in a for-treatment wastewater by an electrochemical technique, wherein at least portions of a pair of electrodes are immersed in the for-treatment wastewater, a material of one of the electrodes constituting an anode is an insoluble conductor, and a material of the other electrode constituting a cathode is an element in the group VIII of the periodic table, a conductor containing the element in the group VIII, or a conductor covered with the element in the same group or the conductor containing the element in the same group.

A second aspect of the present invention is directed to the above wastewater treating method, wherein the for-treatment wastewater is partitioned into a region of the one electrode constituting the anode and a region of the other electrode constituting the cathode by a cation-exchange membrane.

A third aspect of the present invention is directed to the above wastewater treating method, further comprising an ammonia removal treatment step of removing ammonia nitrogen produced in the for-treatment wastewater from the for-treatment wastewater by the above treatment, and a phosphorus removal treatment step of switching polarities of the electrodes to treat phosphorus compounds in the for-treatment wastewater by an electrochemical technique.

A fourth aspect of the present invention is directed to the above wastewater treating method, wherein hypohalogenous acid is added to the for-treatment wastewater in the ammonia removal treatment step.

A fifth aspect of the present invention is directed to the wastewater treating method, wherein the material of the one electrode constituting the anode is a conductor capable of generating hypohalogenous acid, ozone or active oxygen by an electrochemical technique.

A sixth aspect of the present invention is directed to the wastewater treating method, wherein after completion of the above treatment, polarities of the electrodes are switched, and phosphorus compounds in the for-treatment wastewater are treated by an electrochemical technique.

A seventh aspect of the present invention is directed to a wastewater treating method for treating nitrogen compounds in a for-treatment wastewater, wherein the for-treatment wastewater is partitioned into one region and the other region by a cation-exchange membrane, the method comprising a first treatment step in which at least a portion of a first electrode is immersed in the one region; at least a portion of a second electrode is immersed in the other region; the first electrode constituting an anode is a conductor; a material of the second electrode constituting a cathode is an element in the group VIII of the periodic table, a conductor containing the element in the group VIII, or a conductor covered with the element in the same group or the conductor containing the element in the same group; and the for-treatment wastewater is treated by an electrochemical technique, and a second treatment step in which at least a portion of a third electrode is immersed in the other region; a material of the third electrode is a conductor capable of generating hypohalogenous acid, ozone or active oxygen by an electrochemical technique; the third electrode is used as the anode; the first electrode is used as the cathode; and the for-treatment wastewater treated by the first treatment step is treated by the electrochemical technique.

An eighth aspect of the present invention is directed to the above wastewater treating method, further comprising a third treatment step in which after completion of the second treatment step, the second electrode is used as the anode; the first electrode is used as the cathode; and phosphorus compounds in the for-treatment wastewater are treated by the electrochemical technique.

A ninth aspect of the present invention is directed to the above wastewater treating method, wherein the conductor capable of generating hypohalogenous acid, ozone or active oxygen by the electrochemical technique is a noble metal, a conductor covered with the noble metal, a ceramic conductor, a carbon-based conductor or a stainless steel.

A tenth aspect of the present invention is directed to the above wastewater treating method, wherein the ceramic conductor is a ferrite.

An eleventh aspect of the present invention is directed to a wastewater treating apparatus for treating nitrogen compounds in a for-treatment wastewater, comprising a pair of electrodes which is at least partially immersed in the for-treatment wastewater, wherein a material of one of the electrodes is an insoluble conductor; a material of the other electrode is an element in the group VIII of the periodic table, a conductor containing the element in the group VIII, or a conductor covered with the element in the same group or the conductor containing the element in the same group; and the one electrode is used as an anode; the other electrode is used as a cathode; and the for-treatment wastewater is treated by an electrochemical technique.

A twelfth aspect of the present invention is directed to the above wastewater treating apparatus, wherein the material of the one electrode is a conductor capable of generating hypohalogenous acid, ozone or active oxygen by an electrochemical technique.

A thirteenth aspect of the present invention is directed to the above wastewater treating apparatus, further comprising means for switching polarities of the electrodes to treat phosphorus compounds in the for-treatment wastewater by an electrochemical technique.

A fourteenth aspect of the present invention is directed to a wastewater treating apparatus for treating nitrogen compounds in a for-treatment wastewater, comprising a cation-exchange membrane for partitioning the for-treatment wastewater into one region and the other region, a first electrode which is at least partially immersed in the one region, and a second electrode and a third electrode which are at least partially immersed in the other region, wherein a material of the first electrode is a conductor; a material of the second electrode is an element in the group VIII of the periodic table, a conductor containing the element in the group VIII, or a conductor covered with the element in the same group or the conductor containing the element in the same group; and a material of the third electrode is a conductor capable of generating hypohalogenous acid, ozone or active oxygen by an electrochemical technique; the apparatus being adapted to perform a first treatment step in which the first electrode is used as an anode; the second electrode is used as a cathode; and the for-treatment wastewater are treated by the electrochemical technique, and a second treatment step in which after completion of the first treatment step, the third electrode is used as the anode; the first electrode is used as the cathode; and the for-treatment wastewater is treated by the electrochemical technique.

A fifteenth aspect of the present invention is directed to the above wastewater treating apparatus, which is adapted to perform a third treatment step in which after completion of the second treatment step, the second electrode is used as the anode; the first electrode is used as the cathode; and phosphorus compounds in the for-treatment wastewater are treated by the electrochemical technique.

A sixteenth aspect of the present invention is directed to the above wastewater treating apparatus, wherein the conductor capable of generating hypohalogenous acid, ozone or active oxygen by the electrochemical technique is a noble metal, a conductor covered with the noble metal, a ceramic conductor, a carbon-based conductor or a stainless steel.

A seventeenth aspect of the present invention is directed to the above wastewater treating apparatus, wherein the ceramic conductor is a ferrite.

An eighteenth aspect of the present invention is directed to a wastewater treating method for treating nitrogen compounds in a for-treatment wastewater, wherein at least portions of a pair of electrodes are immersed in the for-treatment wastewater, a material of one electrode constituting an anode is a conductor capable of generating hypohalogenous acid, ozone or active oxygen by an electrochemical technique, a material of the other electrode constituting a cathode is a conductor containing iron, and a surface area of a portion of the other electrode which is at least immersed in the for-treatment wastewater is set to be larger than a surface area of a portion of the one electrode which is at least immersed in the for-treatment wastewater; and the for-treatment wastewater is treated by the electrochemical technique.

A nineteenth aspect of the present invention is directed to the above wastewater treating method, wherein after completion of the above treatment, polarities of the electrodes are switched; and phosphorus compounds in the for-treatment wastewater are treated by an electrochemical technique.

A twentieth aspect of the present invention is directed to a wastewater treating method for treating nitrogen compounds in a for-treatment wastewater, comprising a first treatment step in which at least portions of first and second electrodes are immersed in the for-treatment wastewater; a material of the first electrode constituting an anode is a conductor; a material of the second electrode constituting a cathode is a conductor containing iron; a surface area of a portion of the second electrode which is at least immersed in the for-treatment wastewater is set to be larger than a surface area of a portion of the first electrode which is at least immersed in the for-treatment wastewater; and the for-treatment wastewater is treated by the electrochemical technique; a second treatment step in which at least a portion of a third electrode is immersed in the for-treatment wastewater; a material of the third electrode is a conductor capable of generating hypohalogenous acid, ozone or active oxygen by an electrochemical technique, when the third electrode is used as an anode; a surface area of a portion of the third electrode which is at least immersed in the for-treatment wastewater is set to be larger than a surface area of a portion of the first electrode which is at least immersed in the for-treatment wastewater; and after completion of the first treatment step, the third electrode is used as the anode; the second electrode is used as the cathode; and the for-treatment wastewater are treated by the electrochemical technique.

A twenty-first aspect of the present invention is directed to the above wastewater treating method, wherein an operation transfers from the first treatment step to the second treatment step, when ammonia and ammonium-ions in the for-treatment wastewater have reached predetermined concentrations.

A twenty-second aspect of the present invention is directed to the above wastewater treating method, further comprising a third treatment step in which after completion of the second treatment step, the third electrode is used as the cathode; the second electrode is used as the anode; and phosphorus compounds in the for-treatment wastewater are treated by the electrochemical technique.

A twenty-third aspect of the present invention is directed to the above wastewater treating method, wherein a stainless steel is used as the material of the other electrode or the second electrode.

A twenty-fourth aspect of the present invention is directed to the above wastewater treating method, wherein as the conductor capable of generating hypohalogenous acid, ozone or active oxygen by the electrochemical technique, there is used a noble metal or a conductor covered with the noble metal.

A twenty-fifth aspect of the present invention is directed to the above wastewater treating method, wherein as the conductor capable of generating hypohalogenous acid, ozone or active oxygen by the electrochemical technique, there is used a ceramic conductor or a conductor covered with the ceramic conductor.

A twenty-sixth aspect of the present invention is directed to the above wastewater treating method, wherein as the conductor capable of generating hypohalogenous acid, ozone or active oxygen by the electrochemical technique, there is used a carbon-based conductor or a conductor covered with the carbon-based conductor.

A twenty-seventh aspect of the present invention is directed to the above wastewater treating method, wherein as the conductor capable of generating hypohalogenous acid, ozone or active oxygen by the electrochemical technique, there is used a stainless steel or a conductor covered with the stainless steel.

A twenty-eighth aspect of the present invention is directed to a wastewater treating apparatus for treating nitrogen compounds in a for-treatment wastewater, comprising a pair of electrodes which is at least partially immersed in the for-treatment wastewater, wherein a material of one of the electrodes is a conductor capable of generating hypohalogenous acid, ozone or active oxygen by an electrochemical technique; a material of the other electrode is a conductor-containing iron; and a surface area of a portion of the other electrode which is at least immersed in the for-treatment wastewater is set to be larger than a surface area of a portion of the one electrode which is at least immersed in the for-treatment wastewater, and the one electrode is used as an anode; the other electrode is used as a cathode; and the for-treatment wastewater is treated by the electrochemical technique.

A twenty-ninth aspect of the present invention is directed to the above wastewater treating apparatus, further comprising means for switching polarities of the electrodes to treat phosphorus compounds in the for-treatment wastewater by an electrochemical technique.

A thirtieth aspect of the present invention is directed to a wastewater treating apparatus for treating nitrogen compounds in a for-treatment wastewater, comprising first, second and third electrodes which are at least partially immersed in the for-treatment wastewater, wherein the first electrode is a conductor; a material of the second electrode is a conductor containing iron; a material of the third electrode is a conductor capable of generating hypohalogenous acid, ozone or active oxygen by an electrochemical technique when the third electrode is used as an anode; and a surface area of portions of the second and third electrodes which are at least immersed in the for-treatment wastewater is set to be larger than a surface area of a portion of the first electrode which is at least immersed in the for-treatment wastewater, the apparatus being adapted to perform a first treatment step in which the first electrode is used as an anode; the second electrode is used as a cathode; and the for-treatment waste water is treated by the electrochemical technique; and a second treatment step in which after completion of the first treatment step, the third electrode is used as the anode; the second electrode is used as the cathode; and the for-treatment wastewater is treated by the electrochemical technique.

A thirty-first aspect of the present invention is directed to the above wastewater treating apparatus, further comprising means for detecting ammonia and ammonium ions in the for-treatment wastewater, wherein when ammonia and ammonium ions in the for-treatment wastewater have reached predetermined concentrations, an operation transfers from the first treatment step to the second treatment step.

A thirty-second aspect of the present invention is directed to the above wastewater treating apparatus, which is adapted to perform a third treatment step in which after completion of the second treatment step, the third electrode is used as the cathode; the second electrode is used as the anode; and phosphorus compounds in the for-treatment wastewater are treated by the electrochemical technique.

A thirty-third aspect of the present invention is directed to the above wastewater treating apparatus, wherein a material of the other electrode or the second electrode is a stainless steel.

A thirty-fourth aspect of the present-invention is directed to the above wastewater treating apparatus, wherein the conductor capable of generating hypohalogenous acid, ozone or active oxygen by the electrochemical technique is a noble metal or a conductor covered with the noble metal.

A thirty-fifth aspect of the present invention is directed to the above wastewater treating apparatus, wherein the conductor capable of generating hypohalogenous acid, ozone or active oxygen by the electrochemical technique is a ceramic conductor or a conductor covered with the ceramic conductor.

A thirty-sixth aspect of the present invention is directed to the above wastewater treating apparatus, wherein the conductor capable of generating hypohalogenous acid, ozone or active oxygen by the electrochemical technique is a carbon-based conductor or a conductor covered with the carbon-based conductor.

A thirty-seventh aspect of the present invention is directed to the above wastewater treating apparatus, wherein the conductor capable of generating hypohalogenous acid, ozone or active oxygen by the electrochemical technique is a stainless steel or a conductor covered with the stainless steel.

BRIEF DESCRIPTION OF THE DRAWINGS

FIG. 1 is an explanatory view showing an outline of a first embodiment of a wastewater treating apparatus for realizing a wastewater treating method of the present invention;

FIG. 6 is an explanatory view showing an outline of a third embodiment of a wastewater treating apparatus for realizing a wastewater treating method of the present invention;

DETAILED DESCRIPTION OF THE PREFERRED EMBODIMENTS

Figure 2:
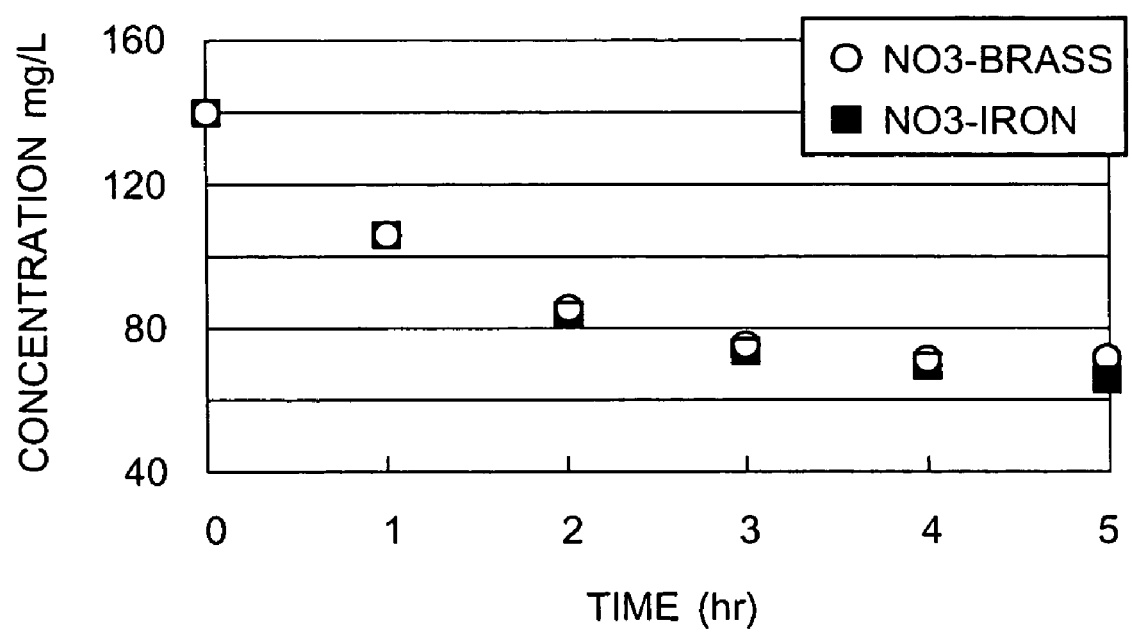
FIG. 2 is a view showing changes in concentrations of nitric acid ions ($NO_3^-$) to be treated by the apparatus of FIG. 1.

Next, preferred embodiments of the present invention will be described with reference to the accompanying drawings.

(1) First Embodiment

First, an embodiment of the present invention will be described by referring to FIGS. 1 and 2. FIG. 1 is an explanatory view showing an outline of a wastewater treating apparatus 1 for realizing the wastewater treating method of the first embodiment of the present invention. The wastewater treating apparatus 1 of the embodiment comprises a treating vessel 2 which constitutes a treating chamber 4 having an inlet and an outlet (not shown) of a wastewater, a pair of electrodes 5, 6 oppositely arranged to be partially immersed in the for-treatment wastewater of the treating chamber 4, a power supply (not shown) to energize the electrodes 5, 6, a controller to control the power supply, etc. Agitation means may be disposed in the treating vessel 2 to agitate the contents therein.

The electrode 6 is made of, for example, iron (Fe) or a conductor covered with the iron as an element in the group VIII of a periodic table, or a conductor containing the element in the group VIII, or a conductor covered with the element in the same group or a conductor containing the element in the same group. The electrode 5 is, for example, a noble metal electrode made of platinum (Pt) or a mixture of platinum and iridium (Ir), or made of an insoluble conductor covered with such en element. According to the embodiment, the iron (Fe) is used as the element in the group VIII of the periodic table, or the conductor containing the element in the group VIII, or the conductor covered with the element in the same group or the conductor containing the element in the same group. In addition, cobalt (Co), nickel (Ni) or the like may be used as long as it is a conductor containing the element in the group VIII. The electrode 5 is the noble metal electrode, or made of the insoluble conductor covered with such an element. In addition, a ceramic-based conductor such as a ferrite, a carbon-based conductor, a stainless steel or the like may be used. According to the embodiment, the mixture of platinum and iridium (platinum/iridium) is used.

Thus, the for-treatment wastewater which contains nitric acid ions as nitrate nitrogen and phosphoric acid ions as phosphorus compounds is reserved in the treating chamber 4 of the treating vessel 2. The power supply is turned ON by the controller to apply a positive potential to the electrode 5 and a negative potential to the electrode 6 (nitrogen treatment step, left side of FIG. 1). Accordingly, the electrode 5 becomes an anode while the electrode 6 becomes a cathode.

As a result of the application of the potentials, electrons generated on the electrode 5 side constituting the anode are fed to the electrode 6 side constituting the cathode, and the nitric acid ions contained as the nitrate nitrogen in the for-treatment wastewater are reduced to nitrous acid ions (reaction A). Further, electrons are fed to the electrode 6 side constituting the cathode to reduce the nitrate nitrogen reduced to the nitrous-acid ions to ammonia (ammonium ions) (reaction B). The reactions A and B are shown below.

$NO_3^- + H_2O + 2e^- \rightarrow NO_2^- + 2OH^-$  Reaction A

$NO_2^- + 5H_2O + 6e^- \rightarrow NH_3(aq) + 7OH^-$  Reaction B

On the other hand, on the platinum/iridium electrode 5 constituting the anode, chloride ions as halide ions contained in the for-treatment wastewater emit electrons to generate chlorine. The chlorine is dissolved in the water to generate hypochlorous acid simultaneously, ozone or active oxygen is generated. According to the embodiment, the chloride ions are contained in the for-treatment wastewater to generate the hypochlorous acid. In addition, if other halide ions are contained in the for-treatment wastewater, similar effects can be obtained even when other hypohalogeneous acid such as hypofluorous acid and hypobromous acid are generated.

In the case of the low concentrations of chloride ions contained in the for-treatment wastewater, for example, halide ions such as chloride ions, iodide ions or bromide ions, or compounds containing such halide ions, e.g., a sodium chloride or a potassium chloride, may be added to the for-treatment wastewater. That is, the chloride ions of the sodium chloride in the for-treatment wastewater are set to 10 ppm or higher to 40000 ppm or lower.

The chloride ions originally contained in the for-treatment wastewater or the sodium chloride added as described above is oxidized on the electrode 5 constituting the anode to generate chlorine (reaction C, shown in the case of the sodium chloride). The generated chlorine reacts with water in the for-treatment wastewater to generate hypochlorous acid (reaction D). Then, the generated hypochlorous acid reacts with the ammonia (ammonium ions) generated in the for-treatment wastewater in the reaction B to make a plurality of chemical changes, and then converted into nitrogen gas (reaction E).

The reactions C to E are shown below.

 Reaction C

 Reaction D

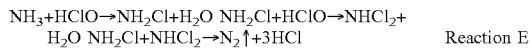 Reaction E

The ammonia (ammonium ions) in the for-treatment wastewater reacts with the ozone or active oxygen generated on the electrode 5 side constituting the anode as shown in a reaction F to be denitrified to nitrogen gas.

 Reaction F

Accordingly, the nitrogen compounds of nitrate nitrogen, nitrite nitrogen and ammonia nitrogen in the for-treatment wastewater can be treated in the same treating vessel 2.

The result of an experiment of FIG. 2 shows the concentration of nitrate nitrogen in the for-treatment wastewater when a platinum, iridium-based electrode is used for the electrode 5 constituting the anode while the electrode 6 constituting the cathode is made of iron or brass (alloy of zinc and copper). In the experiment, constant-current electrolysis was carried out by filling the beaker of 500 ml at KC 1500 ml of 100 mM, and supplying 0.5 A between the electrodes 5, 6 for five hours.

In FIG. 2, a white circle indicates the result of measuring the concentration of nitrate nitrogen (NO3−) for every one hour when brass is used as a cathode, and a black square indicates the same when iron is used as a cathode. It is apparent from the drawing that the use of the ion electrode as the cathode exhibits treatment characteristics similar to those in the case of the brass (iron is better at a low concentration), and the concentration of the nitrate nitrogen becomes equal to/lower than 100 ppm of a wastewater quality standard after the passage of one hour. Here, the elution of toxic copper ions becomes a problem when the brass is used for the cathode. However, according to the present invention, since the iron is used for the cathode, the problem caused by toxicity can be solved while an efficient nitrogen compound treating ability roughly similar to that in the case of the brass is maintained.

After the end of the nitrogen compound treatment (nitrogen treatment step), the controller switches the polarities of potentials applied to the electrodes 5, 6 (right side of FIG. 1, phosphorus treatment step, the nitrogen treatment reaction continues in the for-treatment wastewater even after the switching of the polarities). Thus, the electrode 5 constitutes a cathode while the electrode 6 constitutes an anode. Therefore, since the for-treatment wastewater is subjected to electrolysis as an electrochemical technique, and the electrode 6 constituting the anode is made of the conductor as described above, iron (II) ions are eluted from the electrode 6 into the for-treatment wastewater to be oxidized to iron (III) ions therein.

The generated iron (III) ions are flocculated to settle with the phosphoric acid ions in the for-treatment wastewater by a dephosphorization reaction as shown in a reaction G, whereby iron phosphate which has exsolution in water is generated.

 Reaction G

Thus, the phosphoric acid ions as phosphorus compounds contained in the for-treatment wastewater can be flocculated to settle as iron phosphate.

A portion of the ion (III) ions eluted in the state of the iron (II) ions in the for-treatment wastewater to supply electrons, and oxidized on the electrode or in the for-treatment wastewater receive electrons again on the electrode 5 side constituting the cathode in this case to be reduced to iron (II) ions, and oxidized again on the electrode 6 side constituting the anode or in the for-treatment wastewater.

The technology for electrolyzing the for-treatment wastewater containing the iron (II) ions to reduce the nitric acid ions contained in the for-treatment wastewater to the ammonium ions is disclosed in the "Development of Inorganic Nitrogen Compound Treating Technology Using Electrochemical Reaction" of annual meeting lecture papers of Japan Society on Water Environment distributed at the 33rd meeting of Japan Society on Water Environment held from Mar. 16 to 18 in 1999.

Scales (CaCO$_3$, Mg(OH)$_2$ etc.) grown on the surface of the electrode 6 constituting the cathode in the nitrogen treatment step are cleaned off from the surface when the electrode 6 becomes an anode in the phosphorus treatment step. Accordingly, the electrolytic performance of the electrode 6 can be maintained high.

According to the embodiment, the electrode 5 is the noble metal electrode made of platinum (Pt) or the mixture or platinum and iridium, or an insoluble conductor covered with such an element. In addition, however, the electrode 5 may be made of a ceramic-based conductor such as a ferrite, a carbon-based conductor or a stainless steel. Further, as long as an insoluble conductor is used, the electrode 5 may be an electrode in which no hypohalogenous acid, ozone or active oxygen is generated, or the amount of generation is small by the electrochemical technology. This case will be described by referring to FIG. 5.

Figure 5:
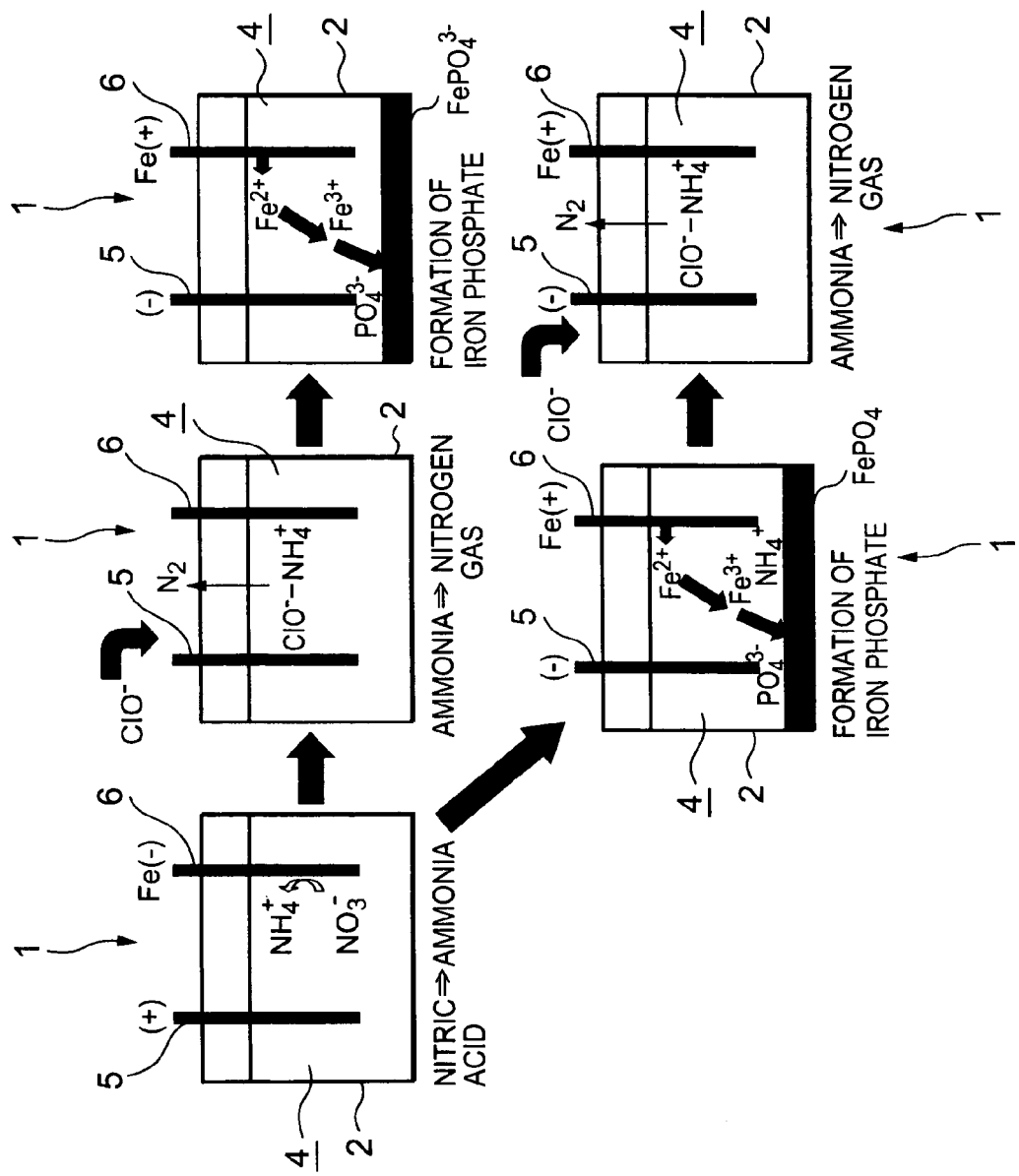
FIG. 5 is an explanatory view showing an outline of another example of the first embodiment of the wastewater treating apparatus of the present invention.

FIG. 5 is an explanatory-view showing an outline of the wastewater treating apparatus 1 of the other example of the first embodiment. In FIG. 5, reference numerals similar to those of FIG. 1 denote identical or similar operations. That is, the for-treatment wastewater which contains nitric acid ions as nitrate nitrogen and phosphoric acid ions; as phosphorus compounds is reserved in the treating chamber 4 of the treating vessel 2. The power supply is turned ON by the controller to apply a positive potential to the electrode 5 and a negative potential to the electrode 6 (nitrogen treatment step, left side of FIG. 5). Accordingly, the electrode 5, becomes an anode while the electrode 6 becomes a cathode.

As a result of the application of the potentials, electrons generated on the electrode 5 side constituting the anode are fed to the electrode 6 side constituting the cathode, and the nitric acid ions contained as the nitrate nitrogen in the for-treatment wastewater are reduced to nitrous acid ions (reaction A). Further, electrons are fed to the electrode 6 side constituting the cathode to reduce the nitrate nitrogen reduced to the nitrous acid ions to ammonia (ammonium ions) (reaction B).

In this case, if the electrode 5 constituting the anode is an electrode in which it is difficult to generate hypohalogeneous acid, ozone or active oxygen by the electrochemical reaction technology as described above, as means for turning OFF the power supply by the controller to remove ammonia nitrogen (ammonia or ammonium ions) from the for-treatment wastewater when the nitric acid ions as the nitrate nitrogen and the nitrous acid ions as nitrite nitrogen in the for-treatment wastewater are nearly reduced to the ammonia nitrogen (ammonia or ammonium ions), for example, a substance which has the effect of removing nitrogen such as drug hypohalogeneous acid, electrolytic hypohalogeneous acid, ozone or the like is added (ammonia removal treatment step, upper center of FIG. 5).

Accordingly, the ammonia nitrogen generated or left in the for-treatment wastewater is converted into nitrogen gas by the hypohalogeneous acid or the ozone (the reactions E and F).

Thus, the nitrogen compounds of nitrate nitrogen, nitrite nitrogen, ammonia nitrogen etc. in the for-treatment wastewater can be treated in the same treating vessel 2.

After the end of the removal treatment of the ammonia nitrogen from the for-treatment wastewater (ammonia removal treatment step), the controller applies a positive potential to the electrode 6 and a negative potential to the electrode 6 (upper right side of FIG. 5, phosphorus treatment step, the nitrogen and ammonia treatment reaction continues in the for-treatment wastewater even after the application of the potentials). Thus, the electrode 5 constitutes a cathode while the electrode 6 constitutes an anode. Therefore, since the for-treatment wastewater is subjected to electrolysis as an electrochemical technique, and the electrode 6 constituting the anode is made of the conductor as described above, iron (II) ions are eluted from the electrode 6 into the for-treatment wastewater to be oxidized to iron (III) ions therein.

The generated iron (III) ions are flocculated to settle with the phosphoric acid ions in the for-treatment wastewater by a dephosphorization reaction (the reaction G), whereby iron phosphate which has exsolution in water is generated. Thus, the phosphoric acid ions as phosphorus compounds contained in the for-treatment wastewater can be flocculated to settle as iron phosphate.

In this case, a portion of the ion (III) ions eluted in the state of the iron (II) ions in the for-treatment wastewater to supply electrons, and oxidized on the electrode or in the for-treatment wastewater receive electrons again on the electrode 5 side constituting the cathode in this case to be reduced to iron (II) ions, and oxidized again on the electrode 6 side constituting the anode or in the for-treatment wastewater.

According to the embodiment, after the treatment (nitrogen treatment step) of the nitrogen compounds in the for-treatment wastewater, the treatment (ammonia removal treatment step) of removing the ammonia nitrogen generated in the nitrogen treatment step is carried out, and then the treatment (phosphorus treatment step) of the phosphorus compounds in the for-treatment wastewater is carried out. In addition, however, as shown in the lower side of FIG. 5, the polarities of the electrodes 5, 6 may be switched to treat the phosphorus compounds (phosphorus treatment step) after the end of the nitrogen treatment step, and then the ammonia nitrogen present in the for-treatment wastewater may be removed (ammonia removal treatment step). Effects similar to those of the above case can be obtained.

Furthermore, according to the embodiment, in the ammonia removal treatment step, the substance which has the effect of removing nitrogen such as the drug hypohalogeneous acid, the electrolytic hypohalogeneous acid, the ozone or the like is added to remove the ammonia nitrogen. In addition, however, a so-called ammonia stripping technology known as a method for removing ammonia nitrogen from a solution may be employed to remove the ammonia nitrogen in the for-treatment wastewater.

Thus, according to the embodiment, since the electrode 5 is made of the insoluble conductor, the elution of the electrode 5 itself can be prevented to improve the durability of the electrode 5. Additionally, since the great amount of sludge is not generated by the great amount of iron eluted in the for-treatment wastewater different from the conventional case, the workability of waste disposal maintenance and adaptability to the environment can be improved.

According to the embodiment, in the nitrogen treatment step, the electrode of high oxygen generation efficiency and low hypohalogeneous acid generation efficiency can be used for the electrode 5 constituting the anode, and the increase of pH in the for-treatment wastewater which occurs during the reduction of the nitrate nitrogen can be suppressed. As a result, it is possible to greatly suppress a reduction in the reduction ability of the nitrate nitrogen.

For the partition of the electrodes 5, 6 of the embodiment, specifically, a later-described cation-exchange membrane (described with reference to a second embodiment) may be used. Thus, it is possible to prevent an inconvenience that nitrous acid ions generated on the electrode 6 constituting the cathode transfer to the electrode 5 side constituting the anode to be oxidized. As a result, the efficiency of the reduction reaction of the nitrate nitrogen in the for-treatment wastewater to the nitrite nitrogen and the ammonia can be further increased.

(2) Second Embodiment

Figure 3:
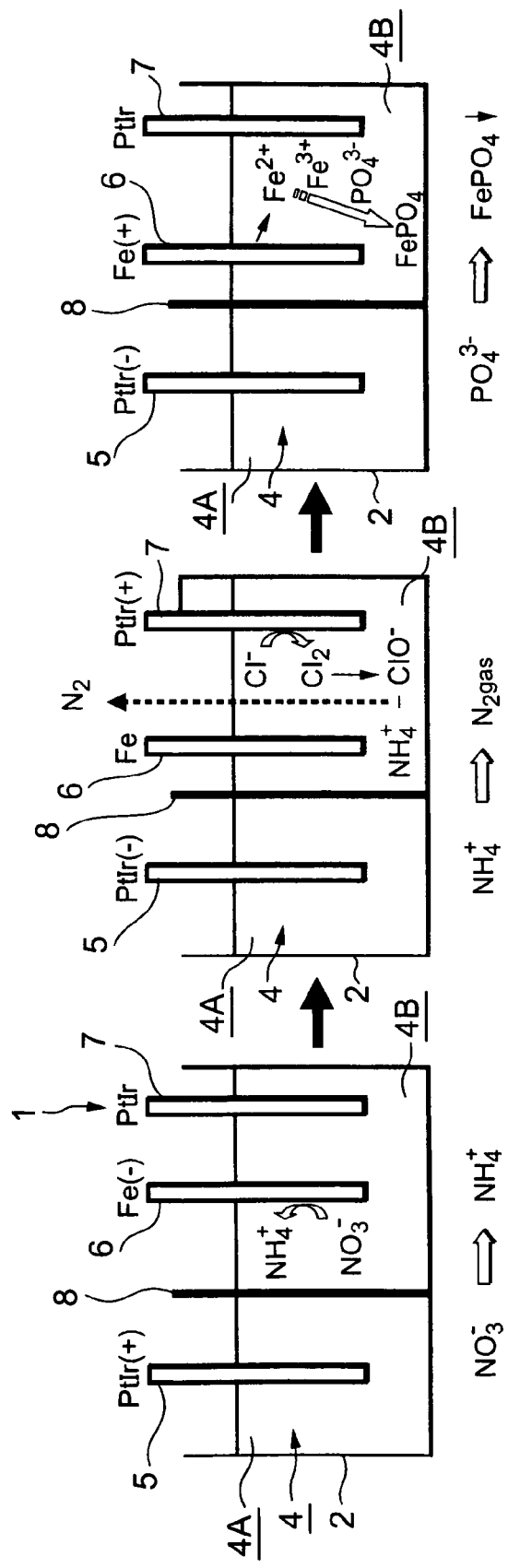
FIG. 3 is an explanatory view showing an outline of a second embodiment of a wastewater treating apparatus of the present invention.

Next, another embodiment of the present invention will be described by referring to FIGS. 3 and 4. FIG. 3 is an explanatory view showing an outline of a wastewater treating apparatus 1 for realizing the wastewater treating method of the second embodiment of the present invention. In the drawings, reference numerals similar to those of FIGS. 1 and 2 denote identical or similar operations.

The wastewater treating apparatus 1 of the embodiment comprises a treating vessel 2 which constitutes a treating chamber 4 having an inlet and an outlet (not shown) for the wastewater therein, a pair of electrodes 5 (first electrode), 6 (second electrode) oppositely arranged to be partially immersed in the for-treatment wastewater of the treating chamber 4, a cation-exchange membrane (barrier membrane: Nafion (product name) by DUPONT) 8 disposed between the electrodes 5, 6 to partition the inside of the treating chamber 4 into one region 4A in which the electrode 5 is present and the other region 4B in which the electrode 6 is present, an electrode 7 (third electrode) arranged to be immersed at least partially in the for-treatment wastewater of the other region 4B of the cation-exchange membrane 8, an unshown power supply to energize the electrodes 5, 6, 7, a controller to control the power supply, etc. Agitation means may be disposed in the treating vessel 2 to agitate the contents therein.

The electrode 6 is made of, for example, iron (Fe) or a conductor covered with the iron as an element in the group VIII of a periodic table, or a conductor containing the element in the group VIII, or a conductor covered with the element in the same group or a conductor containing the element in the same group. Each of the electrodes 5 and 7 is, for example, a noble metal electrode made of platinum (Pt) or a mixture of platinum and iridium (Ir), or made of an insoluble conductor covered with such an element. According to the embodiment, the iron (Fe) is used as the element in the group VIII of the periodic table. In addition, cobalt (Co), nickel (Ni) or the like may be used as long as it is a conductor containing the element in the group VIII. The electrode 5 is the noble metal electrode, or made of the insoluble conductor covered with such an element. In addition, a ceramic-based conductor such as a ferrite, a carbon-based conductor, a stainless steel or the like may be used. According to the embodiment, the mixture of platinum and iridium (platinum/iridium) is used.

Thus, the for-treatment wastewater which contains nitric acid ions as nitrate nitrogen and phosphoric acid ions as phosphorus compounds is reserved in the treating chamber 4 of the treating vessel 2. The power supply is turned ON by the controller to first apply a positive potential to the electrode 5 and a negative potential to the electrode 6 (first treatment step, left side of FIG. 3). At this time, no potential is applied to the electrode 7. Accordingly, the electrode 5 becomes an anode while the electrode 6 becomes a cathode.

As a result of the application of the potentials, electrons generated on the electrode 5 side constituting the anode are fed to the electrode 6 side constituting the cathode, and the nitric acid ions contained as the nitrate nitrogen in the for-treatment wastewater are reduced to nitrous acid ions (the reaction A). Further, electrons are fed to the electrode 6 side constituting the cathode to reduce the nitrate nitrogen reduced to the nitrous acid ions to ammonia (ammonium ions) (the reaction B).

In this case, if the nitrous acid ions generated by reducing the nitric acid ions on the electrode 6 side (other region 4B) constituting the cathode transfer to the one region 4A, an oxidation reaction occurs on the electrode 5 side constituting the anode to oxidize the nitrous acid ions to nitric acid ions (reaction H).

$NO_2^- + H_2O \rightarrow NO_3^- + 2H^+ + 2e^-$      Reaction H

If such an oxidation reaction occurs, the oxidation reaction of the nitrous acid ions occurs on the electrode 5 with respect to the reduction reaction of the nitric acid ions on the electrode 6 to lower nitrogen treatment efficiency. According to the embodiment, however, since the cation-exchange membrane 8 is present between the electrode 5 and the electrode 6, the transfer of the nitrous acid ions to the one region 4a is prevented to inhibit the reaction H. As a result, the nitrogen treatment ability to reduce the nitric acid ions to the ammonia (ammonium ions) can be improved.

After the end of the first treatment step, the controller applies a negative potential to the electrode 5 and a positive electrode to the electrode 7 (second treatment step, center of FIG. 3). At this time, no potential is applied to the electrode 6, or a very small negative potential is applied to prevent iron corrosion. Accordingly, the electrode 7 becomes an anode while the electrode 5 becomes a cathode.

In this case, on the platinum/iridium electrode 7 side constituting the anode, chloride ions as halide ions contained in the for-treatment wastewater emit electrons to generate chlorine. The chlorine is dissolved in the water to generate hypochlorous acid (the reactions C to D). Simultaneously, ozone or active oxygen is generated. According to the embodiment, the chloride ions are contained in the for-treatment wastewater to generate the hypochlorous acid. In addition, if other halide ions are contained in the for treatment wastewater, similar effects can be obtained even when other hypohalogeneous acid such as hypofluorous acid and hypobromous acid are generated.

The generated hypochlorous acid reacts with the ammonia (ammonium ions) generated in the for-treatment wastewater in the reaction B of the first treatment step to make a plurality of chemical changes, and then converted into nitrogen gas (reaction E). The ammonia (ammonium ions) in the for-treatment wastewater reacts with the ozone or active oxygen generated on the electrode 7 side constituting the anode as shown in the reaction F to be denitrified to nitrogen gas.

Accordingly, the nitrogen compounds of nitrate nitrogen, nitrite nitrogen and ammonia nitrogen in the for-treatment wastewater can be treated in the same treating vessel 2.

Figure 4:
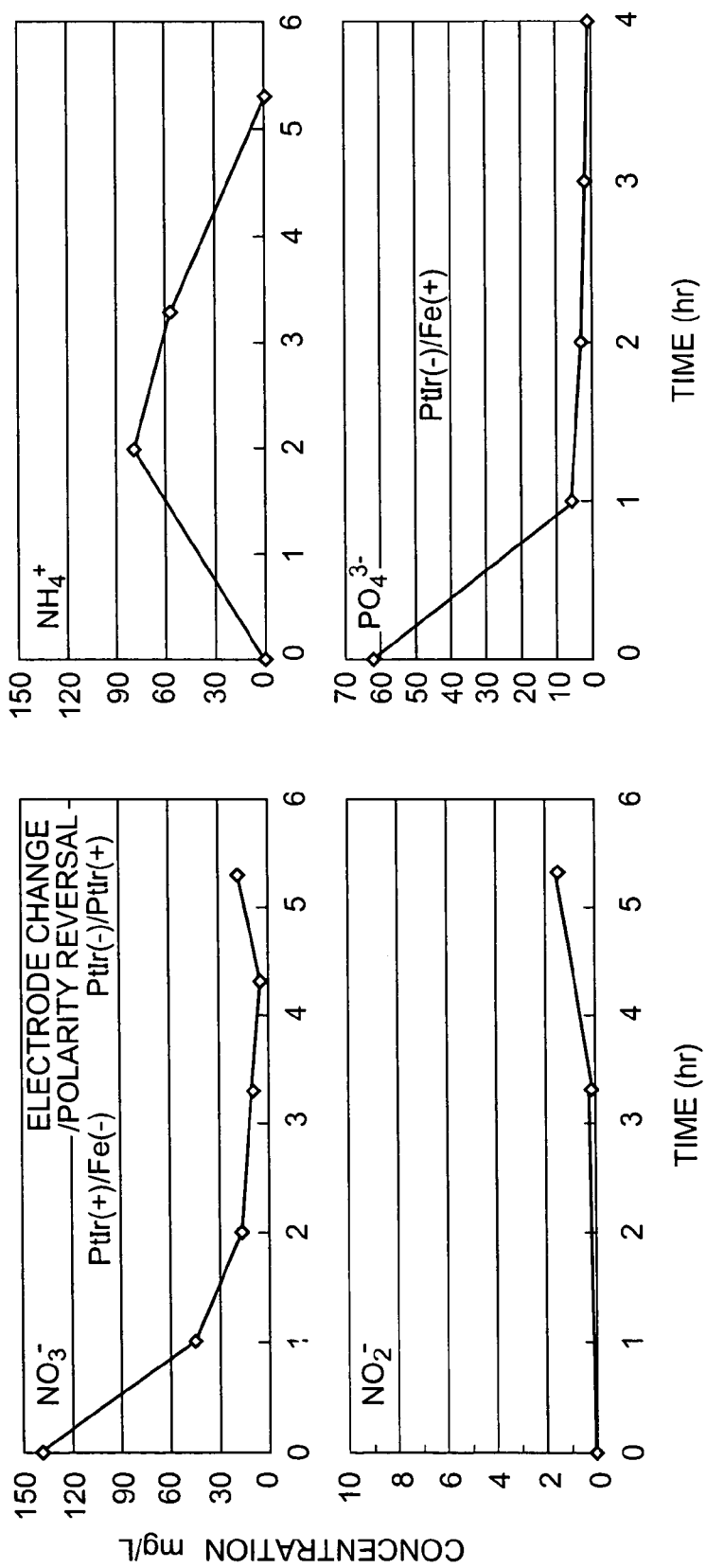
FIG. 4 is a view showing changes in concentrations of nitric acid ions, nitrous acid ions ($NO_2^-$), ammonium ions ($NH_4^+$) and phosphoric acid ions ($PO_4^{3-}$) to be treated by the apparatus of FIG. 3.

The results of experiments of the left upper side, the left lower side and the right upper side of FIG. 4 show the concentrations of nitric acid ions ($NO_3^-$), nitrous acid ions ($NO_2^-$) and ammonium ions ($NH_4^+$) in the for-treatment wastewater when platinum, iridium-based electrodes are used for the electrodes 5, 7 while the electrode 6 is made of iron. In the experiment, constant-current electrolysis was carried out by filling the beaker of 500 ml at KC 1500 ml of 100 mM, and supplying 0.5 A between the electrode 5 (anode) and the electrode 6 (cathode) for 4.3 hours, and subsequently electrolysis was carried out by supplying a current between the electrode 5 (cathode) and the electrode 7 (anode) for 1 hour.

Each of FIG. 4 shows the result of measuring a concentration for every one hour. It is apparent that even if the ion electrode is used as the cathode, the concentration of nitric acid ions is lowered to 50 ppm or lower one hour after the start of the experiment. So it can be understood that the nitrogen treatment is done more efficiently than aforementioned embodiment. Since there is no elution of copper ions as in the aforementioned case, a problem caused by toxicity can be solved while a high nitrogen compound treating ability is maintained.

On the right upper side of FIG. 4, the lowered concentration of the ammonium ions is seen before the start of the second treatment step about two hours or thereafter from the start of the experiment. This occurs because since the cation-exchange membrane 8 is present, pH becomes high in the other region 4B to cause stripping (diffusion into gas).

After the end of the nitrogen compound treatment (first and second nitrogen treatment steps), the controller applies a negative potential to the electrode 5 and a positive potential to the electrode 6. At this time, no potential is applied to the electrode 7. Alternatively, a very small potential is applied to prevent iron corrosion. (right side of FIG. 3, third treatment step, the nitrogen treatment reaction continues in the for-treatment wastewater even after the switching to the potential application to the electrode 6). Thus, the electrode 5: constitutes a cathode while the electrode 6 constitutes an anode. Therefore, since the for-treatment wastewater is subjected to electrolysis as an electrochemical technique, and the electrode 6 constituting the anode is made of the conductor containing iron as the conductor containing the element in the group VIII of the periodic table as described above, iron (II) ions are eluted from the electrode 6 into the for-treatment wastewater to be oxidized to iron (III) ions therein.

The generated iron (III) ions are flocculated to settle with the phosphoric acid ions in the for-treatment wastewater by a dephosphorization reaction as shown in the reaction G, whereby iron phosphate which has exsolution in water is generated. Thus, the phosphoric acid ions as phosphorus compounds contained in the for-treatment wastewater can be flocculated to settle as iron phosphate.

The result of the experiment of the right lower side of FIG. 4 shows the concentration of phosphoric acid ions ($PO_4^{3-}$) in the for-treatment wastewater when a platinum, iridium-based electrode is used for the electrode 5 while the electrode 6 is made of iron. This experiment shows the result of carrying out electrolysis for four hours by setting the electrode 5 as a cathode and the electrode 6 as an anode and supplying a current after the end of the second treatment step.

This case shows the result of measuring the concentration for every one hour. It is apparent that the concentration of phosphoric acid ions which is initially 60 ppm is lowered by 10% or lower to about 5 ppm after the passage of about one hour, and then it is gradually lowered to roughly approach zero after four hours. This situation is similar to that in the phosphorus treatment step of the first embodiment.

Thus, in the third treatment step, as in the previous case, electrons generated on the electrode 6 side constituting the anode are fed to the electrode 5 side constituting the cathode, and the nitric acid ions contained as the nitrate nitrogen in the for-treatment wastewater are reduced to nitrous acid ions (reaction A). Further, electrons are fed to the electrode 5 side constituting the cathode to reduce the nitrate nitrogen reduced to the nitrous acid ions to ammonia (ammonium ions) (reaction B).

If only the nitrogen treatment step is carried out in the first embodiment while only the first and second treatment steps are carried out in the second embodiment, the electrode 6 may be made of a stainless steel. In this case, as the stainless steel, there are available an austenite-based steel type (SUS304), an austenite/ferrite-based steel type (SUS329J1), a ferrite-based steel type (SUS444), a martensite-based steel type (SUS410), a precipitation hardened steel type (SUS631) etc. The aforementioned effects of the nitrogen compound treatment can be expected when such a stainless steel is used. In this case, especially, durability can be improved by preventing the generation of rust on the electrodes.

According to each of the foregoing embodiments, apparently, the nitrogen compounds and the phosphorus compounds in the for-treatment wastewater can be effectively treated by the electrochemical technique. Thus, the nitrogen compounds and the phosphorus compounds in the for-treatment wastewater can be treated in the same treating vessel to eliminate the conventional necessity of installing a large biological treating vessel, and it is possible to prevent increases in facility construction cost and apparatus installation area.

Furthermore, it is possible to eliminate the necessity of complex maintenance work of denitrification bacteria which is necessary in the biological treatment, and to provide stable and high nitrogen and phosphorus treating efficiency.

(3) Third Embodiment

Next, another embodiment of the present invention will be described by referring to FIGS. 6 and 7. FIG. 6 is an explanatory view showing an outline of a wastewater treating apparatus 1 for realizing the wastewater treating method of the third embodiment of the present invention. The wastewater treating apparatus 1 of the embodiment comprises a treating vessel 2 which constitutes a treating chamber 4 having an inlet and an outlet (not shown) for the wastewater therein, a pair of electrodes 5, 6 oppositely arranged to be partially immersed in the for-treatment wastewater of the treating chamber 4, an unshown power supply to energize the electrodes 5, 6, a controller to control the power supply, etc. Agitation means may be disposed in the treating vessel 2 to agitate the contents therein.

The electrode 6 is made of, for example, iron (Fe) or a conductor covered with the iron (conductor containing iron). When it constitutes an anode, the electrode 5 is, for example, a noble metal electrode made of platinum (Pt) or a mixture of platinum and iridium (Ir), or made of an insoluble conductor covered with such en element as a conductor capable of generating hypohalogeneous acid such as hypochlorous acid, ozone, or active oxygen. In addition, as the conductor capable of generating hypohalogeneous acid such as hypochlorous acid, ozone or active oxygen, for example, a ceramic-based conductor, a stainless steel, an insoluble conductor covered with the stainless steel, a carbon-based conductor, or an insoluble conductor covered with the carbon-based conductor may be used. In this case, the conductor can be constructed at low cost. Especially, durability can be improved when the ceramic-based conductor or the conductor such as a stainless steel is used. According to the embodiment, platinum is used.

According to the embodiment, the electrode 6 is made of a plate member while the electrode 5 is made of a linear member such as a wire so that a surface area of at least a portion of the electrode 6 immersed in the for-treatment wastewater can be larger than that of at least a portion of the electrode 5 immersed in the for-treatment wastewater.

Thus, the for-treatment wastewater which contains nitric acid ions as nitrate nitrogen and phosphoric acid ions as phosphorus compounds is reserved in the treating chamber 4 of the treating vessel 2. The power supply is turned ON by the controller to apply a positive potential to the electrode 5 and a negative potential to the electrode 6 (nitrogen treatment step, left side of FIG. 6). Accordingly, the electrode 5 becomes an anode while the electrode 6 becomes a cathode.

As a result of the application of the potentials, electrons generated on the electrode 5 side constituting the anode are fed to the electrode 6 side constituting the cathode, and the nitric acid ions contained as the nitrate nitrogen in the for-treatment wastewater are reduced to nitrous acid ions (reaction I). Further, electrons are fed to the electrode 6 side constituting the cathode to reduce the nitrate nitrogen reduced to the nitrous acid ions to ammonia (ammonium ions) (reaction J). The reactions I and J are shown below.

$$NO_3^- + H_2O + 2e^- \rightarrow NO_2^- + 2OH^-$$ Reaction I $$NO_2^- + 5H_2O + 6e^- \rightarrow NH_3(aq) + 7OH^-$$ Reaction J In this case, when nitrous acid ions generated by reducing the nitric acid ions on the electrode 6 constituting the cathode transfer to the electrode 5 side constituting the anode, an oxidation reaction occurs on the electrode 5 constituting the anode to oxidize the nitrous acid ions to nitric acid ions (reaction K).

$$NO_2^- + H_2O \rightarrow NO_3^- + 2H^+ + 2e^-$$ Reaction K

When such an oxidation reaction occurs, an oxidation reaction occurs in the nitrous acid ions on the electrode 5 with respect to the reduction reaction of the nitric acid ions on the electrode 6 to cause a reduction in nitrogen treatment efficiency. According to the embodiment, however, the reaction K is suppressed because the surface area of at least the portion of the electrode 6 constituting the cathode immersed in the for-treatment wastewater is larger than that of at least the portion of the electrode 5 constituting the anode immersed in the for-treatment wastewater. Thus, a nitrogen treatment ability to reduce the nitric acid ions to ammonia (ammonium ions) is improved.

On the other hand, on the platinum electrode 5 side constituting the anode, chloride ions as halide ions contained in the for-treatment wastewater emit electrons to generate chlorine. The chlorine is dissolved in the water to generate hypochlorous acid simultaneously, ozone or active oxygen is generated.

In the case of the low concentrations of chloride ions contained in the for-treatment wastewater, for example, halide ions such as chloride ions, iodide ions or bromide ions, or compounds containing such halide ions, e.g., a sodium chloride or a potassium chloride, may be added to the for-treatment wastewater. That is, the chloride ions of the sodium chloride in the for-treatment wastewater are set to 10 ppm or higher to 40000 ppm or lower.

The chloride ions originally contained in the for-treatment wastewater or the sodium chloride added as described above is oxidized on the electrode 5 constituting the anode to generate chlorine (reaction L, shown in the case of the potassium chloride). The generated chlorine reacts with water in the for-treatment wastewater to generate hypochlorous acid (reaction M). Then, the generated hypochlorous acid reacts with the ammonia (ammonium ions) generated in the for-treatment wastewater in the reaction J to make a plurality of chemical changes, and then converted into nitrogen gas (reaction N).

The reactions L to N are shown below.

$$KCl \rightarrow K^+Cl^- 2Cl^- \rightarrow Cl_2 + 2e^-$$ Reaction L $$Cl_2 + H_2O \rightarrow HClO + HCl$$ Reaction M $$NH_3 + HClO \rightarrow NH_2Cl + H_2O \; NH_2Cl + HClO \rightarrow NHCl_2 + H_2O \; NH_2Cl + NHCl_2 \rightarrow N_2\uparrow + 3HCl$$ Reaction N The ammonia (ammonium ions) in the for-treatment wastewater reacts with the ozone or active oxygen generated on the electrode 5 side constituting the anode as shown in a reaction O to be denitrified to nitrogen gas.

$$2NH_3(aq) + 3(O) \rightarrow N_2\uparrow + 3H_2O$$ Reaction O

Accordingly, the nitrogen compounds of nitrate nitrogen, nitrite nitrogen and ammonia nitrogen in the for-treatment wastewater can be treated in the same treating vessel 2.

Figure 7:
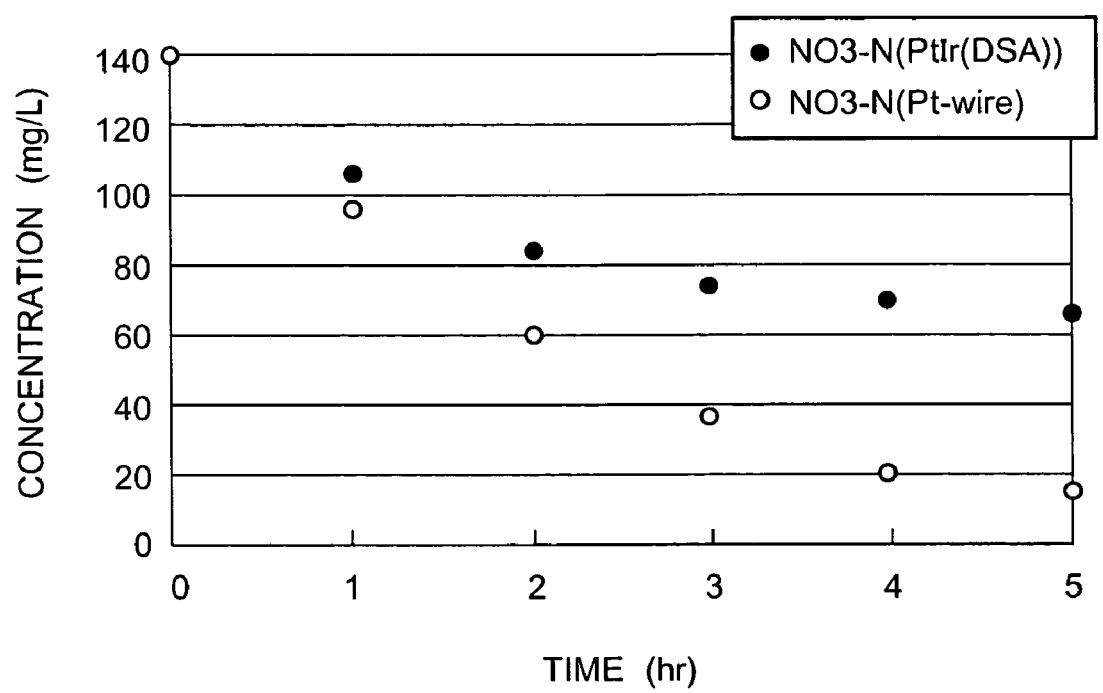
FIG. 7 is a view showing changes in concentrations of nitric acid ions ($NO_3^-$) to be treated by the apparatus of FIG. 6.

The result of an experiment of FIG. 7 shows the concentration of nitrate nitrogen in the for-treatment wastewater when a plate iron electrode of a surface area 35 cm² is used for the electrode 6 constituting the cathode while a platinum wire of a surface area 0.5 cm² is used for the electrode 5 constituting the anode. In the experiment, constant-current electrolysis was carried out in a mixed solution as the for-treatment wastewater of KCl of 100 mM and KNO₃ of 10 mM by supplying 0.5 A between the electrodes 5, 6 for five hours.

In FIG. 7, a white circle indicates the result of measuring the concentration of nitrate nitrogen (NO₃⁻) for every one hour when a platinum wire is used as an anode, and a black circle indicates the same when a platinum-iridium-based plate electrode is used as an anode. It is apparent from the drawing that treatment characteristics are exhibited even if any one of the plate platinum/iridium-based electrode and the platinum wire electrode is used as the anode. However, there is a large difference in treatment characteristics between the case of using the platinum wire electrode as the anode and the case of using the platinum/iridium-based plate electrode as the anode. That is, in the case of using the platinum wire electrode as the anode, the concentration of the nitrate nitrogen becomes equal to/lower than 100 ppm of a wastewater quality standard after the passage of one hour. After the passage of five hours, the concentration of the nitrate nitrogen becomes equal to/lower than 20 ppm. On the other hand, in the case of using the plate platinum/iridium-based electrode as the anode, the concentration of the nitrate nitrogen becomes equal to/lower than 80 ppm after the passage of three hours. After the passage of five hours, however, the treatment progresses only to the concentration of the nitrate nitrogen which is slightly lower than 70 ppm.

Accordingly, it can be understood that high treatment characteristics of the nitrate nitrogen in the for-treatment wastewater can be exhibited by setting the surface area of the portion of the electrode 5 constituting the anode immersed in the for-treatment wastewater to be smaller than that of the portion of the electrode 6 constituting the cathode immersed in the for-treatment wastewater.

Thus, by setting the surface area of the portion of the electrode 6 constituting the cathode immersed in the for-treatment wastewater to be larger than that of the portion of the electrode 5 constituting the anode immersed in the for-treatment wastewater, the reduction reaction of the nitrate nitrogen in the for-treatment wastewater to the nitride nitrogen and the ammonia is promoted on the electrode 6 constituting the cathode, whereby the time of the reduction reaction can be shortened. Additionally, low-concentration nitric acid ions can be treated.

After the end of the nitrogen compound treatment (nitrogen treatment step), the controller switches the polarities of potentials applied to the electrodes 5, 6 (right side of FIG. 6, phosphorus treatment step, the nitrogen treatment reaction continues in the for-treatment wastewater even after the switching of the polarities). Thus, the electrode 5 constitutes a cathode while the electrode 6 constitutes an anode. Therefore, since the for-treatment wastewater is subjected to electrolysis as an electrochemical technique, and the electrode 6 constituting the anode is made of the conductor containing the iron as described above, iron (II) ions are eluted from the electrode 6 into the for-treatment wastewater to be oxidized to iron (III) ions therein.

The generated iron (III) ions are flocculated to settle with the phosphoric acid ions in the for-treatment wastewater by a dephosphorization reaction as shown in a reaction P, whereby iron phosphate which has exsolution in water is generated.

$$Fe^{3+} + PO_4^{3-} \rightarrow FePO_4\downarrow$$ Reaction P

Thus, the phosphoric acid ions as phosphorus compounds contained in the for-treatment wastewater can be flocculated to settle as iron phosphate.

A portion of the ion (III) ions eluted in the state of the iron (II) ions in the for-treatment wastewater to supply electrons, and oxidized on the electrode or in the for-treatment wastewater receives electrons again on the electrode 5 side constituting the cathode in this case to be reduced to iron (II) ions, and oxidized again on the electrode 6 side constituting the anode or in the for-treatment wastewater.

The technology for electrolyzing the for-treatment wastewater containing the iron (II) ions to reduce the nitric acid ions contained in the for-treatment wastewater to the ammonium ions is disclosed in the "Development of Inorganic Nitrogen Compound Treating Technology Using Electrochemical Reaction" of the annual meeting lecture papers of Japan Society on Water Environment.

Scales ($CaCO_3$, $Mg(OH)_2$ etc.) grown on the surface of the electrode 6 constituting the cathode in the nitrogen treatment step are cleaned off from the surface when the electrode 6 becomes an anode in the phosphorus treatment step. Accordingly, the electrolytic performance of the electrode 6 can be maintained high.

(4) Fourth Embodiment

Figure 8:
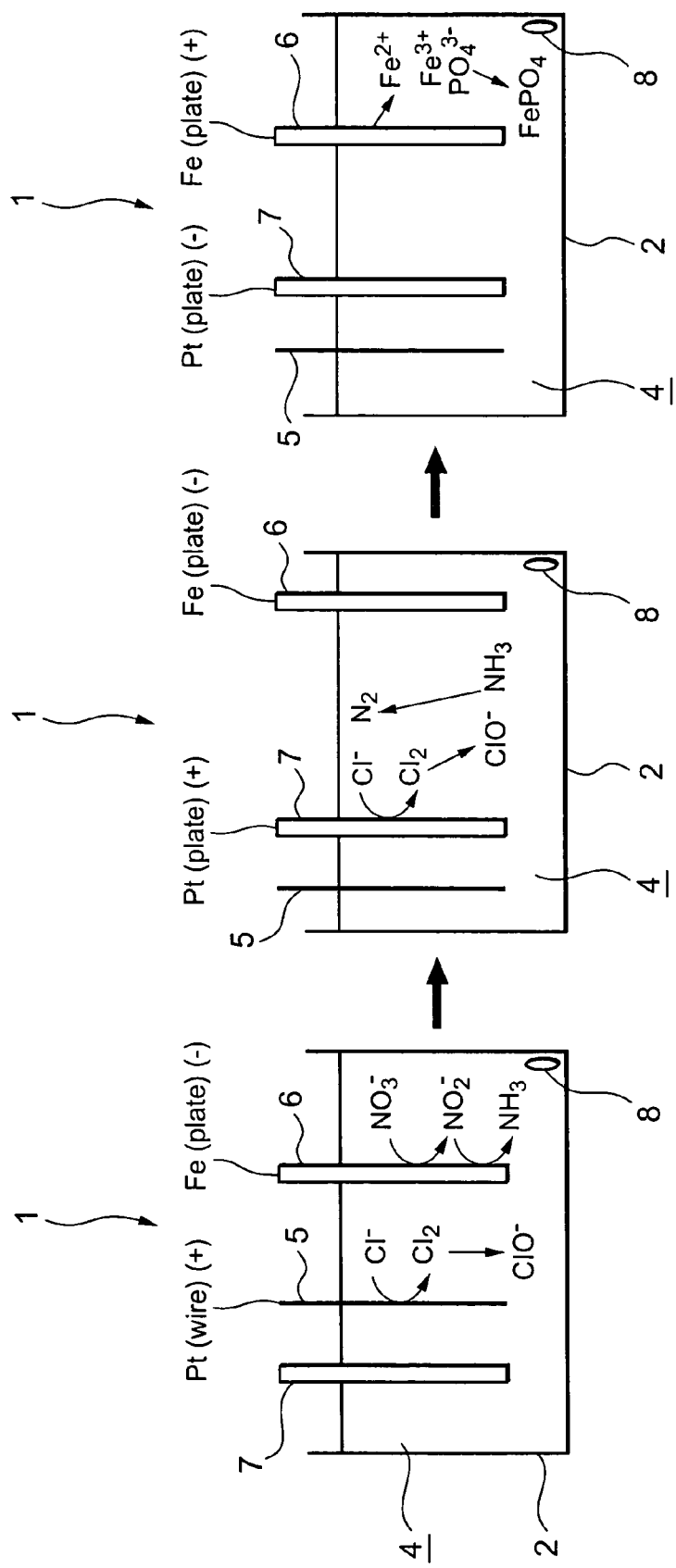
FIG. 8 is an explanatory view showing an outline of a fourth embodiment of a wastewater treating apparatus of the present invention.

Next, another embodiment of the present invention will be described by referring to FIG. 8. FIG. 8 is an explanatory view showing an outline of a wastewater treating apparatus 1 for realizing the wastewater treating method of the fourth embodiment of the present invention. In the drawings, reference numerals similar to those of FIG. 6 denote identical or similar operations.

The wastewater treating apparatus 1 of the embodiment comprises a treating vessel 2 which constitutes a treating chamber 4 having an inlet and an outlet (not shown) for the wastewater therein, a pair of electrodes 5 (first electrode), 6 (second electrode) oppositely arranged to be partially immersed in the for-treatment wastewater of the treating chamber 4, an electrode 7 (third electrode) arranged to be immersed at least partially in the for-treatment wastewater, an unshown power supply to energize the electrodes 5, 6, 7, a controller to control the power supply, an ammonia concentration detection sensor 8 for detecting ammonia and ammonium ion concentrations in the for-treatment wastewater, etc. Agitation means may be disposed in the treating vessel 2 to agitate the contents therein.

The electrode 6 is made of, for example, iron (Fe) or a conductor covered with the iron. Each of the electrodes 5 and 7 is, for example, a noble metal electrode made of platinum (Pt) or a mixture of platinum and iridium (Ir), or made of an insoluble conductor covered with such an element. In addition, as a conductor capable of generating hypohalogeneous acid such as hypochlorous acid, ozone or active oxygen, for example, a ceramic-based conductor, an insoluble conductor covered with the ceramic-based conductor, a stainless steel, an insoluble conductor covered with the stainless, a carbon-based conductor, or an insoluble conductor covered with the carbon-based conductor may be used. In this case, the conductor can be prepared at low cost. Especially, durability can be improved when the ceramic-based conductor or the conductor such as a stainless steel is used.

According to the embodiment, the electrode 6 is made of a plate member while the electrode 5 is made of a linear member such as a wire so that a surface area of at least a portion of the electrode 6 immersed in the for-treatment wastewater can be larger than that of at least a portion of the electrode 5 immersed in the for-treatment wastewater. According to the embodiment, the electrode 7 is also made of a plate member so that at least a portion of the electrode 7 immersed in the treatment water can be larger than that of at least the portion of the electrode immersed in the for-treatment wastewater. According to the embodiment, platinum is used for both of the electrodes 5 and 7.

Thus, the for-treatment wastewater which contains nitric acid ions as nitrate nitrogen and phosphoric acid ions as phosphorus compounds is reserved in the treating chamber 4 of the treating vessel 2. The power supply is turned ON by the controller to apply a positive potential to the electrode 5 and a negative potential to the electrode 6 (first treatment step, left side of FIG. 8). At this time, no potential is applied to the electrode 7. Accordingly, the electrode 5 becomes an anode while the electrode 6 becomes a cathode.

As a result of the application of the potentials, electrons generated on the electrode 5 side constituting the anode are fed to the electrode 6 side constituting the cathode, and the nitric acid ions contained as the nitrate nitrogen in the for-treatment wastewater are reduced to nitrous acid ions (the reaction I). Further, electrons are fed to the electrode 6 side constituting the cathode to reduce the nitrate nitrogen reduced to the nitrous acid ions to ammonia (ammonium ions) (the reaction J).

In this case, when nitrous acid ions generated by reducing the nitric acid ions on the electrode 6 constituting the cathode transfer to the electrode 5 side constituting the anode, an oxidation reaction occurs on the electrode 5 constituting the anode to oxidize the nitrous acid ions to nitric acid ions (the reaction K).

When such an oxidation reaction occurs, an oxidation reaction occurs in the nitrous acid ions on the electrode 5 with respect to the reduction reaction of the nitric acid ions on the electrode 6 to cause a reduction in nitrogen treatment efficiency. According to the embodiment, however, the reaction K is suppressed because the surface area of at least the portion of the electrode 6 constituting the cathode immersed in the for-treatment wastewater is larger than that of at least the portion of the electrode 5 constituting the anode immersed in the for-treatment wastewater. Thus, a nitrogen treatment ability to reduce the nitric acid ions to ammonia (ammonium ions) is improved.

The ammonia concentration detector sensor 8 detects ammonia or ammonium ion concentrations in the for-treatment wastewater. When the ammonia and ammonium ion concentrations in the for-treatment wastewater reach predetermined values, the first treatment step is finished.

In addition to the ammonia concentration detection sensor 8, a nitric acid ion concentration detection sensor (not shown) may be disposed in the wastewater treating apparatus 1 to detect concentrations of nitric acid ions in the for-treatment wastewater. In a state in which the nitric acid ion concentration detection sensor detects that the nitric acid ions have almost been removed from the for-treatment wastewater, the ammonia and ammonium ion concentrations in the for-treatment wastewater may be detected by the ammonia concentration detection sensor 8, and the first treatment step may be finished when the ammonia and ammonium ion concentrations in the for-treatment wastewater are equal to/higher than the predetermined values.

After the end of the first treatment step, the controller applies a negative potential to the electrode 6 and a positive electrode to the electrode 7 (second treatment step, center of FIG. 8). At this time, no potential is applied to the electrode 5. Accordingly, the electrode 7 becomes an anode while the electrode 6 becomes a cathode.

In this case, on the platinum electrode 7 constituting the anode, chloride ions contained in the for-treatment wastewater emit electrons to generate chlorine. The chlorine is dissolved in the water to generate hypochlorous acid (the reactions L to M). Simultaneously, ozone or active oxygen is generated.

The generated hypochlorous acid reacts with the ammonia (ammonium ions) generated in the for-treatment wastewater in the reaction J of the first treatment step to make a plurality of chemical changes, and then converted into nitrogen gas (the reaction N). In the first treatment step, the ammonia (ammonium ions) in the for-treatment wastewater reacts with the ozone or active oxygen generated on the electrode 5 side constituting the anode as shown in the reaction O to be denitrified to nitrogen gas.

According to the embodiment, in the second treatment step, the negative potential is applied to the electrode 6 while the positive potential is applied to the electrode 7. However, similar effects can be obtained by applying a negative potential to the electrode 6 and positive potentials to the electrodes 7 and 5.

Accordingly, the nitrogen compounds of nitrate nitrogen, nitrite nitrogen and ammonia nitrogen in the for-treatment wastewater can be treated in the same treating vessel 2.

Thus, since the first treatment step is switched to the second treatment step by the detection of the ammonia concentration detector sensor 8, an oxidation reaction from nitrous acid ions to nitric acid ions can be suppressed. Moreover, while the ammonia and ammonium ions cannot be completely removed on the electrode 5 as the first electrode, by switching to the electrode 7 as the third electrode, the ammonia and the ammonium ions in the for-treatment wastewater can be quickly converted into nitrogen gas.

After the end of such treatment of the nitrogen compounds (first and second treatment steps), the controller applies a negative potential to the electrode 7 and a positive potential to the electrode 6. At this time, no potential is applied to the electrode 5 (right side of FIG. 8, third treatment step, the nitrogen treatment continues in the for-treatment wastewater even after the switching of potential application). Thus, the electrode 7 constitutes a cathode while the electrode 6 constitutes an anode. Therefore, since the for-treatment wastewater is subjected to electrolysis as an electrochemical technique, and the electrode 6 constituting the anode is made of the conductor containing the iron as described above, iron (II) ions are eluted from the electrode 6 into the for-treatment wastewater to be oxidized to iron (III) ions therein.

The generated iron (III) ions are flocculated to settle with the phosphoric acid ions in the for-treatment wastewater by a dephosphorization reaction as shown in the reaction P, whereby iron phosphate which has exsolution in water is generated. Thus, the phosphoric acid ions as phosphorus compounds contained in the for-treatment wastewater can be flocculated to settle as iron phosphate.

According to the embodiment, in the third treatment step, the negative potential is applied to the electrode 7 while the positive potential is applied to the electrode 6. In addition, similar effects can obtained when negative potentials are applied to the electrodes 7 and 5, and a positive potential is applied to the electrode 6.

If only the nitrogen treatment step is carried out in the third embodiment, or only the first and second treatment steps are carried out in the fourth embodiment, the electrode 6 may be made of a stainless steel. In this case, as the stainless steel, there are available an austenite-based steel type (SUS304), an austenite/ferrite-based steel type (SUS329J1), a ferrite-based steel type (SUS444), a martensite-based steel type (SUS410), a precipitation hardened steel type (SUS631) etc. The aforementioned effects of the nitrogen compound treatment can be expected when such a stainless steel is used. In this case, especially, durability can be improved by preventing the generation of rust on the electrodes.

According to each of the foregoing embodiments, the nitrogen compounds and the phosphorus compounds in the for-treatment wastewater can be effectively treated by the electrochemical technique. Thus, the nitrogen compounds and the phosphorus compounds in the for-treatment wastewater can be treated in the same treating vessel to eliminate the conventional necessity of installing a large biological treating vessel, and it is possible to prevent increases in facility construction cost and apparatus installation area.

Furthermore, it is possible to eliminate the necessity of complex maintenance work of denitrification bacteria which is necessary in the biological treatment, and to provide stable and high nitrogen and phosphorus treating efficiency.

According to each of the embodiments, the halide ions contained in the for-treatment wastewater are chloride ions to generate hypochlorous acid. In addition, similar effects can be obtained even when other hypohalogeneous acid is generated by fluoride ions, bromide ions or the like.

As described above, according to the present invention, when the nitrogen compounds in the for-treatment wastewater are treated, at least portions of the pair of electrodes are immersed in the for-treatment wastewater, the material of one of the electrodes constituting the anode is an insoluble conductor, the material of the other electrode constituting the cathode is an element in the group VIII of the periodic table, a conductor containing the element in the group VIII, or a conductor covered with the element in the same group or the conductor containing the element in the same group, and the for-treatment wastewater is treated by the electrochemical technique. Thus, on the electrode constituting the cathode, the reduction reaction of the nitrate nitrogen in the for-treatment wastewater to the nitrous acid nitrogen or ammonia is promoted. As a result, the time of reduction reaction can be shortened, and low-concentration nitric acid ions can be treated.

In this case, since the material of the one electrode constituting the anode is the insoluble conductor, elution from the electrode itself can be prevented to improve the durability of the electrode. Moreover, since there is no great amount of sludge generated by the great amount of iron eluted into the for-treatment wastewater different from the conventional case, the workability of waste disposal maintenance and adaptability to the environment can be improved.

Especially, in this case, since the other electrode constituting the cathode is made of the material which is the element in the group VIII of the periodic table, the conductor containing the element in the group VIII, the conductor covered with the element in the same group or the conductor containing the element in the same group, and an alloy containing copper is not used, the problem of toxicity caused by the elution of copper in the for-treatment wastewater can be solved.

According to the present invention, by removing the ammonia nitrogen generated in the for-treatment wastewater, the nitrogen compounds in the for-treatment wastewater can be efficiently treated.

According to the present invention, the for-treatment wastewater is partitioned into the region of the one electrode constituting the anode and the region of the other electrode constituting the cathode by the cation-exchange membrane. Thus, the nitrous acid ions generated on the other electrode constituting the cathode transfer to the one electrode side constituting the anode to prevent the inconvenience of oxidation thereof. As a result, the efficiency of the reduction reaction of the nitrate nitrogen in the for-treatment wastewater to the nitrous acid nitrogen and ammonia can be further improved.

According to the present invention, the ammonia removal treatment step of removing ammonia nitrogen generated in the for-treatment wastewater from the for-treatment wastewater by the aforementioned treatment, and the phosphorus removal treatment step of switching the polarities of the electrodes to treat the phosphorus compounds in the for-treatment wastewater by an electrochemical technique are carried out. Thus, the ammonia nitrogen generated in the aforementioned treatment can be efficiently treated in the ammonia removal treatment step.

By carrying out the phosphorus removal step of switching the polarities of the electrodes to treat the phosphorus compounds in the for-treatment wastewater by the electrochemical technique, for example, iron (II) ions in the group VIII of the periodic table are eluted in the for-treatment wastewater by the other electrode constituting the anode, the iron (III) ions generated by oxidation in the for-treatment wastewater are chemically reacted with the phosphoric acid ions as the phosphorus compounds in the for-treatment wastewater, and flocculated to settle as iron phosphate.

According to the present invention, in addition, the material of the one electrode constituting the anode is a conductor capable of generating hypohalogenous acid, ozone or active oxygen by the electrochemical technique. Thus, on the other electrode constituting the cathode, the reduction reaction of the nitrate nitrogen in the for-treatment wastewater to the nitrous acid nitrogen or ammonia is promoted. As a result, the time of the reduction reaction can be shortened, and low-concentration nitric acid ions can be treated.

Since the ammonia generated on the other electrode constituting the cathode is subjected to denitrification reaction with the substance such as hypochlorous acid as hypohalogeneous acid generated on the one electrode constituting the anode, it is possible to effectively remove the nitrate nitrogen, the ammonia nitrogen and the nitrogen components such as nitrogen compounds by a synergy effect. Thus, the nitrogen compounds can be efficiently removed from the for-treatment wastewater which contains the nitrogen compounds discharged from general households, factories or the like to improve the nitrogen compound treating ability.

According to the present invention, after the completion of the aforementioned treatment, the polarities of the electrodes are switched, and the phosphorus compounds in the for-treatment wastewater are treated by the electrochemical technique. Thus, for example, iron (II) ions as the element in the group VIII of the periodic table are eluted into the for-treatment wastewater from the other electrode constituting the anode, the iron (III) ions generated by oxidation in the for-treatment wastewater are chemically reacted with the phosphoric acid ions as the phosphorus compounds in the for-treatment wastewater, and flocculated to settle as iron phosphate.

Thus, the phosphorus compounds in the for-treatment wastewater can be treated.

According to the present invention, when the nitrogen compounds in the for-treatment wastewater are treated, the for-treatment wastewater is partitioned into one region and the other region by the cation-exchange membrane, and the first treatment step is carried out in which at least a portion of the first electrode is immersed in the one region; at least a portion of the second electrode is immersed in the other region; the first electrode constituting an anode is a conductor; a material of the second electrode constituting a cathode is an element in the group VIII of the periodic table, a conductor containing the element in the group VIII, or a conductor covered with the element in the same group or the conductor containing the element in the same group; and the for-treatment wastewater is treated by an electrochemical technique. Thus, on the second electrode constituting the cathode, the reduction reaction of the nitrate nitrogen in the for-treatment wastewater to the nitrite nitrogen or ammonia is promoted. As a result, the time of reduction reaction can be shortened, and low-concentration nitric acid ions can be treated.

In this case, the for-treatment wastewater is partitioned into the region in which the first electrode constituting the anode is immersed and the region in which the second electrode constituting the cathode is immersed by the cation-exchange membrane. Thus, the nitrous acid ions generated on the second electrode constituting the cathode transfer to the first electrode side constituting the anode to prevent the inconvenience of oxidation thereof. As a result, the efficiency of the reduction reaction of the nitrate nitrogen in the for-treatment wastewater to the nitrous acid nitrogen and ammonia can be further improved.

Additionally, the second treatment step is carried out in which at least a portion of the third electrode is immersed in the other region; a material of the third electrode is a conductor capable of generating hypohalogenous acid, ozone or active oxygen by an electrochemical technique; the third electrode is used as the anode; the first electrode is used as the cathode; and the for-treatment wastewater treated by the first treatment step is treated by the electrochemical technique. Accordingly, since the ammonia generated on the second electrode constituting the cathode in the first treatment step is subjected to denitrification reaction with the substance such as hypochlorous acid as hypohalogeneous acid generated on the third electrode constituting the anode in the second treatment step, it is possible to effectively remove the nitrate nitrogen, the ammonia nitrogen and the nitrogen components such as nitrogen compounds by a synergy effect. Thus, the nitrogen compounds can be efficiently removed from the for-treatment wastewater which contains the nitrogen compounds discharged from general households, factories or the like to improve the nitrogen compound treating ability.

Especially, in this case, since the second electrode constituting the cathode is made of the material which is the element in the group VIII of the periodic table, the conductor containing the element in the group VIII, the conductor covered with the element in the same group or the conductor containing the element in the same group, and an alloy containing copper is not used, the problem of toxicity caused by the elution of copper in the for-treatment wastewater can be solved.

According to the present invention, after the completion of the second treatment, the third treatment step is carried out in which the phosphorus compounds in the for-treatment wastewater are treated by the electrochemical technique while the first electrode is set as the cathode. Thus, for example, iron (II) ions as the element in the group VIII of the periodic table are eluted into the for-treatment wastewater from the second electrode constituting the anode in the third treatment step, the iron (III) ions generated by oxidation in the for-treatment wastewater are chemically reacted with the phosphoric acid ions as the phosphorus compounds in the for-treatment wastewater, and flocculated to settle as iron phosphate.

Thus, the phosphorus compounds in the for-treatment wastewater can be treated.

According to the present invention, the conductor capable of generating hypohalogenous acid, ozone or active oxygen by the electrochemical technique is a noble metal, a conductor covered with the noble metal, a ceramic conductor, a ferrite, a carbon-based conductor or a stainless steel. Thus, the hypohalogeneous acid, the ozone or the active oxygen can be easily generated in the for-treatment wastewater, and the denitrification treatment of the ammonia or the ammonium ions can be effectively carried out.

According to the present invention, when the nitrogen compounds in the for-treatment wastewater are treated, at least portions of the pair of electrodes are immersed in the for-treatment wastewater, the material of one of the electrodes constituting the anode is a conductor capable of generating hypohalogeneous acid, ozone or active oxygen by the electrochemical technology, the material of the other electrode constituting the cathode is a conductor containing iron, and the for-treatment wastewater is treated by the electrochemical technique. Thus, on the other electrode constituting the cathode, the reduction reaction of the nitrate nitrogen in the for-treatment wastewater to the nitrite nitrogen or ammonia is promoted. As a result, the time of reduction reaction can be shortened, and low-concentration nitric acid ions can be treated.

The surface area of at least the portion of the other electrode constituting the cathode immersed in the for-treatment wastewater is set to be larger than that of the portion of the one electrode constituting the anode immersed in the for-treatment wastewater, and the for-treatment wastewater is treated by the electrochemical technique. Thus, the oxidation reaction of the nitrogen compounds generated on the one electrode constituting the anode, especially from the nitrite nitrogen to the nitrate nitrogen, reduced, and accordingly the reduction reaction from the nitrate nitrogen to the nitrite nitrogen on the other electrode constituting the cathode is promoted. Thus, the reduction reaction from the nitrate nitrogen to the nitrite nitrogen or the ammonia is promoted much more to enable the shortening of the time of the reduction reaction, and the treatment of low-concentration nitric acid ions.

Since the ammonia generated on the other electrode constituting the cathode is subjected to denitrification reaction with the substance such as hypochlorous acid as hypohalogeneous acid generated on the one electrode constituting the anode, it is possible to effectively remove the nitrate-nitrogen, the ammonia nitrogen and the nitrogen components such as nitrogen compounds by a synergy effect. Thus, the nitrogen compounds can be efficiently removed from the for-treatment wastewater which contains the nitrogen compounds discharged from general households, factories or the like to improve the nitrogen compound treating ability.

According to the present invention, after the completion of the aforementioned treatment, the polarities of the electrodes are switched, and the phosphorus compounds in the for-treatment wastewater are treated by the electrochemical technique. Thus, iron (II) ions are eluted into the for-treatment wastewater from the other electrode constituting the anode, the iron (III) ions generated by oxidation in the for-treatment wastewater are chemically reacted with the phosphoric acid ions as the phosphorus compounds in the for-treatment wastewater, and flocculated to settle as iron phosphate.

Thus, the phosphorus compounds in the for-treatment wastewater can be treated.

According to the present invention, the wastewater treating method for treating nitrogen compounds in the for-treatment wastewater, comprises: the first treatment step in which at least portions of the first and second electrodes are immersed in the for-treatment wastewater; the material of the first electrode constituting an anode is a conductor; the material of the second electrode constituting a cathode is a conductor containing iron; the surface area of the portion of the second electrode which is at least immersed in the for-treatment wastewater is set to be larger than that of the portion of the first electrode which is at least immersed in the for-treatment wastewater; and the for-treatment wastewater is treated by the electrochemical technique; and the second treatment step in which at least a portion of the third electrode is immersed in the for-treatment wastewater; the material of the third electrode is a conductor capable of generating hypohalogenous acid, ozone or active oxygen by the electrochemical technique, when the third electrode is used as an anode; the surface area of the portion of the third electrode which is at least immersed in the for-treatment wastewater is set to be larger than that of the portion of the first electrode which is at least immersed in the for-treatment wastewater; and after completion of the first treatment step, the third electrode is used as the anode; the second electrode is used as the cathode; and the for-treatment wastewater are treated by the electrochemical technique. Thus, on the second electrode constituting the cathode, the reduction reaction of the nitrate nitrogen in the for-treatment wastewater to the nitrite nitrogen or ammonia is promoted. As a result, the time of reduction reaction can be shortened, and low-concentration nitric acid ions can be treated.

The surface area of at least the portion of the second electrode constituting the cathode immersed in the for-treatment wastewater is set to be larger than that of the portion of the first electrode constituting the anode immersed in the for-treatment wastewater, and the for-treatment wastewater is treated by the electrochemical technique. Thus, the oxidation reaction of the nitrogen compounds generated on the first electrode constituting the anode, especially from the nitrite nitrogen to the nitrate nitrogen, is reduced, and accordingly the reduction reaction from the nitrate nitrogen to the nitrite nitrogen on the second electrode constituting the cathode can be promoted. Thus, the reduction reaction from the nitrate nitrogen to the nitrite nitrogen or the ammonia is promoted much more to enable the shortening of the time of the reduction reaction, and the treatment of low-concentration nitric acid ions.

Additionally, the second treatment step is carried out in which at least a portion of the third electrode is immersed in the other region; the material of the third electrode is a conductor capable of generating hypohalogenous acid, ozone or active oxygen by the electrochemical technique; the surface of at least the portion of the third electrode immersed in the for-treatment wastewater is set to be larger than that of at least the portion of the first electrode immersed in the for-treatment wastewater; the third electrode is used as the anode; the second electrode is used as the cathode; and the for-treatment wastewater after the completion of the first treatment step is treated by the electrochemical technique. Accordingly, since the ammonia generated on the second electrode constituting the cathode in the first treatment step is subjected to denitrification reaction with the substance such as hypochlorous acid as hypohalogeneous acid generated on the third electrode constituting the anode in the second treatment step, it is possible to effectively remove the nitrate nitrogen, the ammonia nitrogen and the nitrogen components such as nitrogen compounds by a synergy effect. Thus, the nitrogen compounds can be efficiently removed from the for-treatment wastewater which contains the nitrogen compounds discharged from general households, factories or the like to improve the nitrogen compound treating ability.

Especially, in this case, since the surface area of at least the portion of the third electrode constituting the anode immersed in the for-treatment wastewater is set to be larger than that of at least the portion of the thirst electrode immersed in the for-treatment wastewater in the second treatment step, the generation of a substance such as hypohalogeneous acid generated on the third electrode constituting the anode in the second treatment step can be promoted. Thus, the denitrification reaction with the ammonia nitrogen in the for-treatment wastewater can be promoted. As a result, it is possible to more effectively remove the nitrate nitrogen, the ammonia nitrogen and the nitrogen components such as nitrogen compounds.

According to the present invention, the operation transfers from the first treatment step to the second treatment step, when ammonia and ammonium ions in the for-treatment wastewater reach the predetermined concentrations. Thus, after the nitrate nitrogen and the nitrous acid nitrogen in the for-treatment wastewater are subjected to reduction reaction on the second electrode constituting the cathode to reduce the nitrate nitrogen in the for-treatment wastewater to the ammonia and ammonium ions in the first treatment step, the operation can transfer to the second treatment step.

Thus, after the nitrate nitrogen and the hypohalogeneous nitrogen in the for-treatment wastewater have been sufficiently reduced to the ammonia and ammonium ions, in the second treatment step, ammonia denitrification reaction can be carried out by a substance such as hypohalogeneous ions generated on the third electrode constituting the anode. As a result, it is possible to more effectively remove the nitrate nitrogen, the ammonia nitrogen and the nitrogen components such as nitrogen compounds.

According to the present invention, the third treatment step is carried out in which after the completion of the second treatment step, the third electrode is used as the cathode; the second electrode is used as the anode; and the phosphorus compounds in the for-treatment wastewater are treated by the electrochemical technique. Thus, in the third treatment step, iron (II) ions can be eluted into the for-treatment wastewater from the second electrode constituting the anode, the iron (III) ions generated by oxidation in the for-treatment wastewater can be chemically reacted with the phosphoric acid ions as the phosphorus compounds in the for-treatment wastewater, and flocculated to settle as iron phosphate.

Thus, the phosphorus compounds in the for-treatment wastewater can be treated.

According to the present invention, in each of the foregoing inventions, a stainless steel is used as the material of the other electrode or the second electrode. Thus, it is possible to improve the durability of the other electrode or the second electrode in the treatment of the nitrogen compounds in the for-treatment water.

According to the present invention, the conductor capable of generating hypohalogenous acid, ozone or active oxygen by the electrochemical technique is a noble metal or a conductor covered with the noble metal. Thus, hypohalogeneous acid, ozone or active oxygen can be easily generated in the for-treatment wastewater, and the denitification reaction of ammonia or ammonium ions can be effectively carried out.

According to the present invention, the conductor capable of generating hypohalogenous acid, ozone or active oxygen by the electrochemical technique is a ceramic-based conductor or a conductor covered with the ceramic-based conductor. Thus, hypohalogeneous acid, ozone or active oxygen can be easily generated in the for-treatment wastewater, and the denitrification reaction of ammonia or ammonium ions can be effectively carried out.

Additionally, the use of the ceramic-based conductor enables preparation of a durable conductor at low cost.

According to the present invention, the conductor capable of generating hypohalogenous acid, ozone or active oxygen by the electrochemical technique is a carbon-based conductor or a conductor covered with the carbon-based conductor. Thus, hypohalogeneous acid, ozone or active oxygen can be easily generated in the for-treatment wastewater, and the denitrification reaction of ammonia or ammonium ions can be effectively carried out.

Additionally, the use of the carbon-based conductor enables preparation of a conductor at low cost.

According to the present invention, the conductor capable of generating hypohalogenous acid, ozone or active oxygen by the electrochemical technique is a stainless steel or a conductor covered with the stainless steel. Thus, hypohalogeneous acid, ozone or active oxygen can be easily generated in the for-treatment wastewater, and the denitrification reaction of ammonia or ammonium ions can be effectively carried out.

Additionally, the use of the stainless steel enables preparation of a durable conductor at low cost.

What is claimed is:

1. A wastewater treating method for treating nitrogen compounds in a for-treatment wastewater by an electrochemical technique comprising:

an ammonia removal treatment step of removing ammonia nitrogen produced in the for-treatment wastewater from the for-treatment wastewater, and a phosphorus removal treatment step of switching polarities of the electrodes to treat phosphorus compounds in the for-treatment wastewater by an electrochemical technique, wherein at least portions of a pair of electrodes are immersed in the for-treatment wastewater, a material of one of the electrodes constituting an anode is an insoluble conductor, and a material of the other electrode constituting a cathode is an element in the group VIII of the periodic table, a conductor containing the element in the group VIII, or a conductor covered with the element in the same group or the conductor containing the element in the same group.

2. The wastewater treating method according to claim 1, wherein the for-treatment wastewater is partitioned into a region of the one electrode constituting the anode and a region of the other electrode constituting the cathode by a cation-exchange membrane.

3. The wastewater treating method according to claim 1, wherein hypohalogenous acid is added to the for-treatment wastewater in the ammonia removal treatment step.

4. The wastewater treating method according to claim 1, wherein the material of the one electrode constituting the anode is a conductor capable of generating hypohalogenous acid, ozone or active oxygen by an electrochemical technique.

5. The wastewater treating method according to claim 4, wherein after completion of the treatment according to claim 1, polarities of the electrodes are switched, and phosphorus compounds in the for-treatment wastewater are treated by an electrochemical technique.

6. A wastewater treating method for treating nitrogen compounds in a for-treatment wastewater, wherein the for-treatment wastewater is partitioned into one region and the other region by a cation-exchange membrane, the method comprising:

a first treatment step in which at least a portion of a first electrode is immersed in the one region; at least a portion of a second electrode is immersed in the other region; the first electrode constituting an anode is a conductor; a material of the second electrode constituting a cathode is an element in the group VIII of the periodic table, a conductor containing the element in the group VIII, or a conductor covered with the element in the same group or the conductor containing the element in the same group; and the for-treatment wastewater is treated by an electrochemical technique, and a second treatment step in which at least a portion of a third electrode is immersed in the other region; a material of the third electrode is a conductor capable of generating hypohalogenous acid, ozone or active oxygen by an electrochemical technique; the third electrode is used as the anode; the first electrode is used as the cathode; and the for-treatment wastewater treated by the first treatment step is treated by the electrochemical technique.

7. The wastewater treating method according to claim 6, further comprising a third treatment step in which after completion of the second treatment step, the second electrode is used as the anode; the first electrode is used as the cathode; and phosphorus compounds in the for-treatment wastewater are treated by the electrochemical technique.

8. The wastewater treating method according to claim 4, 5, 6 or 7, wherein the conductor capable of generating hypohalogenous acid, ozone or active oxygen by the electrochemical technique is a noble metal, a conductor covered with the noble metal, a ceramic conductor, a carbon-based conductor or a stainless steel.

9. The wastewater treating method according to claim 8, wherein the ceramic conductor is a ferrite.

10. A wastewater treating apparatus for treating nitrogen compounds in a for-treatment wastewater, comprising a pair of electrodes which is at least partially immersed in the for-treatment wastewater and means for switching polarities of the electrodes to treat phosphorus compounds in the for-treatment wastewater by an electrochemical technique,
wherein a material of one of the electrodes is an insoluble conductor; a material of the other electrode is an element in the group VIII of the periodic table, a conductor containing the element in the group VIII, or a conductor covered with the element in the same group or the conductor containing the element in the same group; and
the one electrode is used as an anode; the other electrode is used as a cathode; and the for-treatment wastewater is treated by an electrochemical technique.

11. The wastewater treating apparatus according to claim 10, wherein the material of the one electrode is a conductor capable of generating hypohalogenous acid, ozone or active oxygen by an electrochemical technique.

12. A wastewater treating apparatus for treating nitrogen compounds in a for-treatment wastewater, comprising:
a cation-exchange membrane for partitioning the for-treatment wastewater into one region and the other region,
a first electrode which is at least partially immersed in the one region, and
a second electrode and a third electrode which are at least partially immersed in the other region,
wherein a material of the first electrode is a conductor; a material of the second electrode is an element in the group VIII of the periodic table, a conductor containing the element in the group VIII, or a conductor covered with the element in the same group or the conductor containing the element in the same group; and a material of the third electrode is a conductor capable of generating hypohalogenous acid, ozone or active oxygen by an electrochemical technique;
the apparatus being adapted to perform a first treatment step in which the first electrode is used as an anode; the second electrode is used as a cathode; and the for-treatment wastewater are treated by the electrochemical technique, and
a second treatment step in which after completion of the first treatment step, the third electrode is used as the anode; the first electrode is used as the cathode; and the for-treatment wastewater is treated by the electrochemical technique.

13. The wastewater treating apparatus according to claim 12, which is adapted to perform a third treatment step in which after completion of the second treatment step, the second electrode is used as the anode; the first electrode is used as the cathode; and phosphorus compounds in the for-treatment wastewater are treated by the electrochemical technique.

14. The wastewater treating apparatus according to claim 11, 12 or 13, wherein the conductor capable of generating hypohalogenous acid, ozone or active oxygen by the electrochemical technique is a noble metal, a conductor covered with the noble metal, a ceramic conductor, a carbon-based conductor or a stainless steel.

15. The wastewater treating apparatus according to claim 14, wherein the ceramic conductor is a ferrite.

16. A wastewater treating method for treating nitrogen compounds in a for-treatment wastewater, wherein
at least portions of a pair of electrodes are immersed in the for-treatment wastewater,
a material of one electrode constituting an anode is a conductor capable of generating hypohalogenous acid, ozone or active oxygen by an electrochemical technique,
a material of the other electrode constituting a cathode is a conductor containing iron, and
a surface area of a portion of the other electrode which is at least immersed in the for-treatment wastewater is set to be larger than a surface area of a portion of the one electrode which is at least immersed in the for-treatment wastewater; and the for-treatment wastewater is treated by the electrochemical technique.

17. The wastewater treating method according to claim 16, wherein after completion of the treatment according to claim 18, polarities of the electrodes are switched; and phosphorus compounds in the for-treatment wastewater are treated by an electrochemical technique.

18. A wastewater treating method for treating nitrogen compounds in a for-treatment wastewater, comprising:
a first treatment step in which at least portions of first and second electrodes are immersed in the for-treatment wastewater; a material of the first electrode constituting an anode is a conductor; a material of the second electrode constituting a cathode is a conductor containing iron; a surface area of a portion of the second electrode which is at least immersed in the for-treatment wastewater is set to be larger than a surface area of a portion of the first electrode which is at least immersed in the for-treatment wastewater; and the for-treatment wastewater is treated by the electrochemical technique;
a second treatment step in which at least a portion of a third electrode is immersed in the for-treatment wastewater; a material of the third electrode is a conductor capable of generating hypohalogenous acid, ozone or active oxygen by an electrochemical technique, when the third electrode is used as an anode; a surface area of a portion of the third electrode which is at least immersed in the for-treatment wastewater is set to be larger than a surface area of a portion of the first electrode which is at least immersed in the for-treatment wastewater; and after completion of the first treatment step, the third electrode is used as the anode; the second electrode is used as the cathode; and the for-treatment wastewater are treated by the electrochemical technique.

19. The wastewater treating method according to claim 18, wherein an operation transfers from the first treatment step to the second treatment step, when ammonia and ammonium ions in the for-treatment wastewater have reached predetermined concentrations.

20. The wastewater treating method according to claim 18 or 19, further comprising a third treatment step in which after completion of the second treatment step, the third electrode is used as the cathode; the second electrode is used as the anode; and phosphorus compounds in the for-treatment wastewater are treated by the electrochemical technique.

21. The wastewater treating method according to claim 16, 17, 18 or 19, wherein a stainless steel is used as the material of the other electrode or the second electrode.

22. The wastewater treating method according to claim 16, 17, 18 or 19, wherein as the conductor capable of generating hypohalogenous acid, ozone or active oxygen by the electrochemical technique, there is used a noble metal or a conductor covered with the noble metal.

23. The wastewater treating method according to claim 16, 17, 18 or 19, wherein as the conductor capable of generating hypohalogenous acid, ozone or active oxygen by the electrochemical technique, there is used a ceramic conductor or a conductor covered with the ceramic conductor.

24. The wastewater treating method according to claim 16, 17, 18 or 19, wherein as the conductor capable of generating hypohalogenous acid, ozone or active oxygen by the electrochemical technique, there is used a carbon-based conductor or a conductor covered with the carbon-based conductor.

25. The wastewater treating method according to claim 16, 17, 18 or 19, wherein as the conductor capable of generating hypohalogenous acid, ozone or active oxygen by the electrochemical technique, there is used a stainless steel or a conductor covered with the stainless steel.

26. A wastewater treating apparatus for treating nitrogen compounds in a for-treatment wastewater, comprising a pair of electrodes which is at least partially immersed in the for-treatment wastewater,
    wherein a material of one of the electrodes is a conductor capable of generating hypohalogenous acid, ozone or active oxygen by an electrochemical technique; a material of the other electrode is a conductor containing iron; and a surface area of a portion of the other electrode which is at least immersed in the for-treatment wastewater is set to be larger than a surface area of a portion of the one electrode which is at least immersed in the for-treatment wastewater, and
    the one electrode is used as an anode; the other electrode is used as a cathode; and the for-treatment wastewater is treated by the electrochemical technique.

27. The wastewater treating apparatus according to claim 26, further comprising means for switching polarities of the electrodes to treat phosphorus compounds in the for-treatment wastewater by an electrochemical technique.

28. A wastewater treating apparatus for treating nitrogen compounds in a for-treatment wastewater, comprising first, second and third electrodes which are at least partially immersed in the for-treatment wastewater,
    wherein the first electrode is a conductor; a material of the second electrode is a conductor containing iron; a material of the third electrode is a conductor capable of generating hypohalogenous acid, ozone or active oxygen by an electrochemical technique when the third electrode is used as an anode; and a surface area of portions of the second and third electrodes which are at least immersed in the for-treatment wastewater is set to be larger than a surface area of a portion of the first electrode which is at least immersed in the for-treatment wastewater,
    the apparatus being adapted to perform a first treatment step in which the first electrode is used as an anode; the second electrode is used as a cathode; and the for-treatment wastewater is treated by the electrochemical technique; and
    a second treatment step in which after completion of the first treatment step, the third electrode is used as the anode; the second electrode is used as the cathode; and the for-treatment wastewater is treated by the electrochemical technique.

29. The wastewater treating apparatus according to claim 28, further comprising means for detecting ammonia and ammonium ions in the for-treatment wastewater, wherein when ammonia and ammonium ions in the for-treatment wastewater have reached predetermined concentrations, an operation transfers from the first treatment step to the second treatment step.

30. The wastewater treating apparatus according to claim 28 or 29, which is adapted to perform a third treatment step in which after completion of the second treatment step, the third electrode is used as the cathode; the second electrode is used as the anode; and phosphorus compounds in the for-treatment wastewater are treated by the electrochemical technique.

31. The wastewater treating apparatus according to claim 26, 27, 28 or 29, wherein a material of the other electrode or the second electrode is a stainless steel.

32. The wastewater treating apparatus according to claim 26, 27, 28 or 29, wherein the conductor capable of generating hypohalogenous acid, ozone or active oxygen by the electrochemical technique is a noble metal or a conductor covered with the noble metal.

33. The wastewater treating apparatus according to claim 26, 27 28 or 29, wherein the conductor capable of generating hypohalogenous acid, ozone or active oxygen by the electrochemical technique is a ceramic conductor or a conductor covered with the ceramic conductor.

34. The wastewater treating apparatus according to claim 26, 27, 28 or 29, wherein the conductor capable of generating hypohalogenous acid, ozone or active oxygen by the electrochemical technique is a carbon-based conductor or a conductor covered with the carbon-based conductor.

35. The wastewater treating apparatus according to claim 26, 27, 28 or 29, wherein the conductor capable of generating hypohalogenous acid, ozone or active oxygen by the electrochemical technique is a stainless steel or a conductor covered with the stainless steel.

* * * * *